US011784828B2

(12) United States Patent
Kurita

(10) Patent No.: US 11,784,828 B2
(45) Date of Patent: Oct. 10, 2023

(54) COMPUTER-READABLE RECORDING MEDIUM STORING INFORMATION PROCESSING PROGRAM, INFORMATION PROCESSING METHOD, INFORMATION PROCESSING DEVICE, AND INFORMATION PROCESSING SYSTEM

(71) Applicant: FUJITSU LIMITED, Kawasaki (JP)

(72) Inventor: Toshihiko Kurita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 240 days.

(21) Appl. No.: 17/474,094

(22) Filed: Sep. 14, 2021

(65) Prior Publication Data

US 2022/0191044 A1    Jun. 16, 2022

(30) Foreign Application Priority Data

Dec. 10, 2020    (JP) .................................. 2020-204679

(51) Int. Cl.
*H04L 29/06*    (2006.01)
*H04L 9/32*    (2006.01)

(52) U.S. Cl.
CPC .......... *H04L 9/3263* (2013.01); *H04L 9/3247* (2013.01)

(58) Field of Classification Search
CPC ... H04L 9/3263; H04L 9/3247; H04L 9/3268; G06F 21/645; G06F 21/42; G06F 21/64; G06F 21/602
See application file for complete search history.

(56) References Cited

U.S. PATENT DOCUMENTS

2004/0181756 A1*    9/2004    Berringer ................ G06F 21/64
713/176
2007/0022293 A1    1/2007    Hayashi et al.
(Continued)

FOREIGN PATENT DOCUMENTS

JP    2004-013488 A    1/2004
JP    2013-179569 A    9/2013

OTHER PUBLICATIONS

Authors et. al.: Disclosed Anonymously, "System for and Method of Verifying Authenticity of a Document Source", IP.com No. IPCOM000004764D IP.com Electronic Publication Date: May 4, 2001 (Year: 2001 ).*
(Continued)

*Primary Examiner* — Ka Shan Choy
(74) *Attorney, Agent, or Firm* — Fujitsu Patent Center

(57) ABSTRACT

A recording medium storing a program for causing a computer to execute processing including: creating first and second partial certificate information from certificate information that includes attribute information of a signer and certification information used to certify the attribute information, based on a data amount of an electronic document, in response to a signing request for the electronic document; generating an electronic signature for the electronic document and the first partial certificate information; attaching the generated electronic signature to the electronic document and the first partial certificate information, and transmitting the electronic document and the first partial certificate information with the electronic signature attached to a submission source of the electronic document; and transmitting the second partial certificate information to a verification device that verifies authenticity of the certificate information, using another route different from a route that
(Continued)

connects the submission source and a submission destination of the electronic document.

9 Claims, 22 Drawing Sheets

(56) References Cited

U.S. PATENT DOCUMENTS

| | | | |
|---|---|---|---|
| 2007/0168671 A1 | 7/2007 | Takenaka et al. | |
| 2008/0120505 A1* | 5/2008 | Mizuno | H04L 9/3263 |
| | | | 713/176 |
| 2009/0059797 A1* | 3/2009 | Northcutt | H04L 45/122 |
| | | | 370/238 |
| 2010/0313117 A1* | 12/2010 | Fukasawa | G06F 21/64 |
| | | | 715/243 |
| 2019/0132931 A1 | 5/2019 | Sharma et al. | |
| 2020/0344070 A1* | 10/2020 | Li | H04L 9/0825 |

OTHER PUBLICATIONS

Extended European Search Report dated Feb. 10, 2022 for European Patent Application No. 21195524.0, 5 pages.

* cited by examiner

FIG. 6

```
                                                              600
┌─────────────────────────────────────────────────────────────┐
│ JOB TITLE: PRESIDENT                                        │
│ NAME: FUJI TARO                                             │
│ ADDRESS: XXX, NAKAHARA-KU, KAWASAKI CITY                    │
│ DATE OF BIRTH:1988/1/1                                      │
│ SOCIAL SECURITY AND TAX NUMBER:123456···                    │
│ AGE:32                                                      │
│                                                             │
│ SIGNATURE:XXXX                                              │
└─────────────────────────────────────────────────────────────┘
```

FIG. 8

```
┌─────────────────────────────────────────┐
│ CERTIFICATION INFORMATION               │
├─────────────────────────────────────────┤
│ proof {                                 │
│     proofs {                            │
│         primary_proof {                 │
│             revealed_attributes {       │
│                 name#1: value#1;        │
│                      :                  │
│                 name#m: value#m;        │
│             }                           │
│             unrevealed_attributes {     │
│                 mj_hat#1;               │
│                      :                  │
│                 mj_hat#n;               │
│             }                           │
│             credential_siganture_ZKP {  │
│                 a_prime;                │
│                 e_hat;                  │
│                 v_hat;                  │
│             }                           │
│             predicate_attribute {       │
│                 u_hat1,,u_hat4;         │
│                 r_hat1,,r_hat4          │
│                 r_hat_delta;            │
│                 alfa_hat;               │
│             }                           │
│         }                               │
│         non_revoc_proof {               │
│                 x_list;                 │
│         }                               │
│         aggregated_proof {              │
│                 c_hash;                 │
│         }                               │
│ }                                       │
└─────────────────────────────────────────┘
```
800

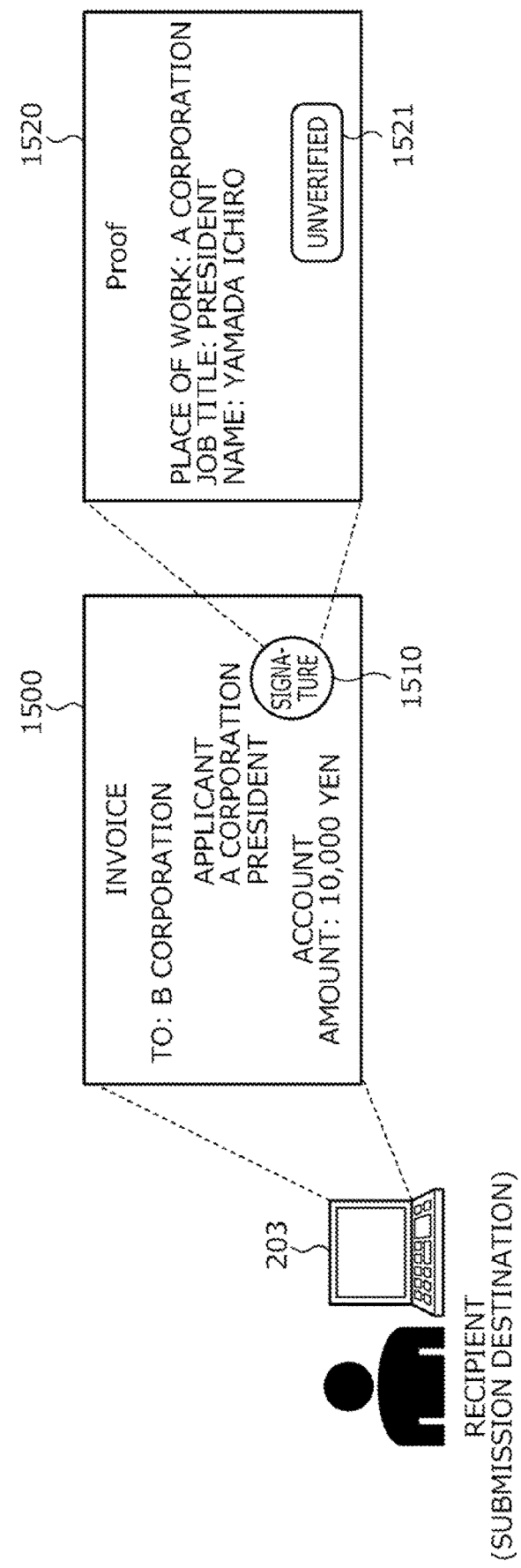

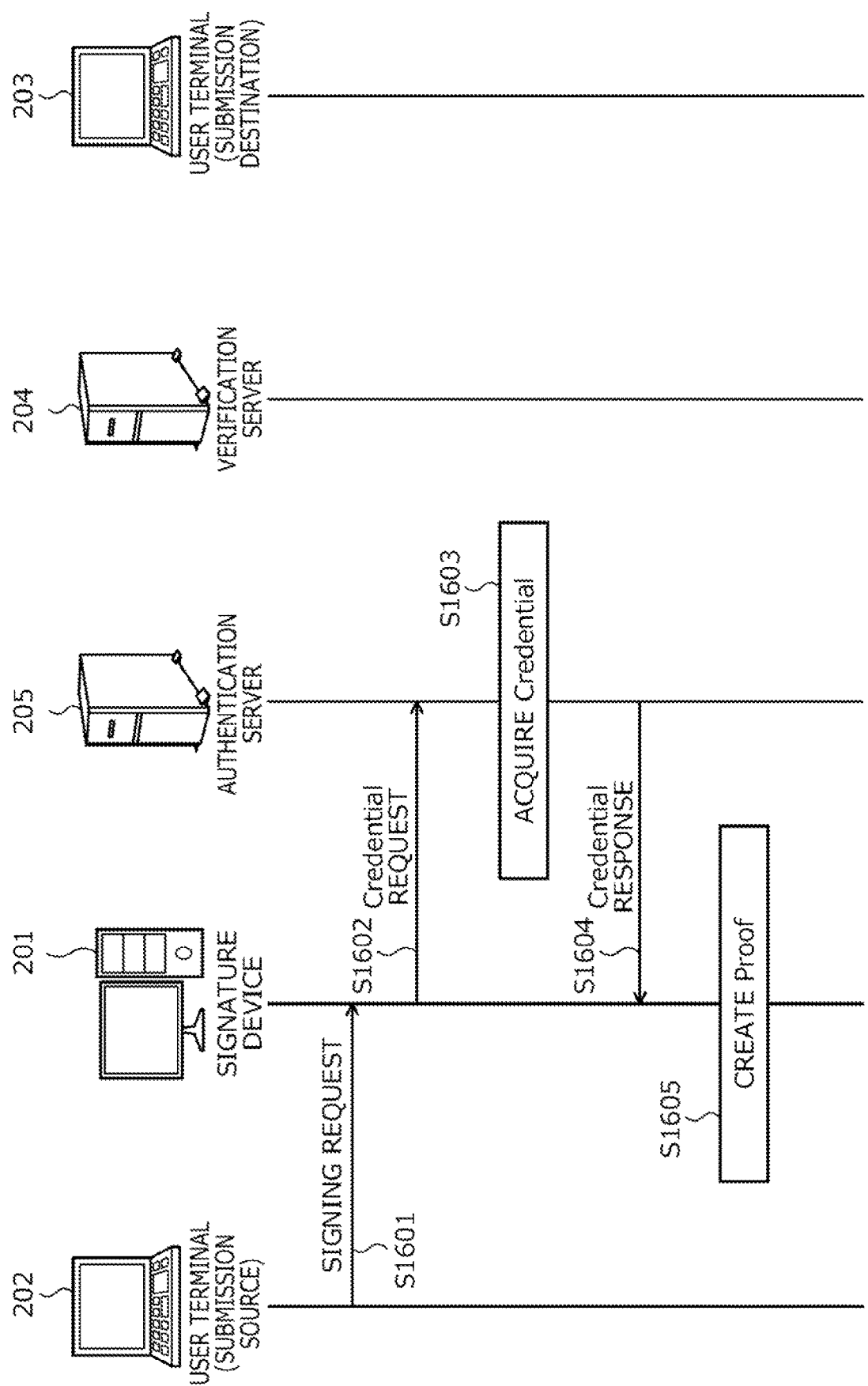

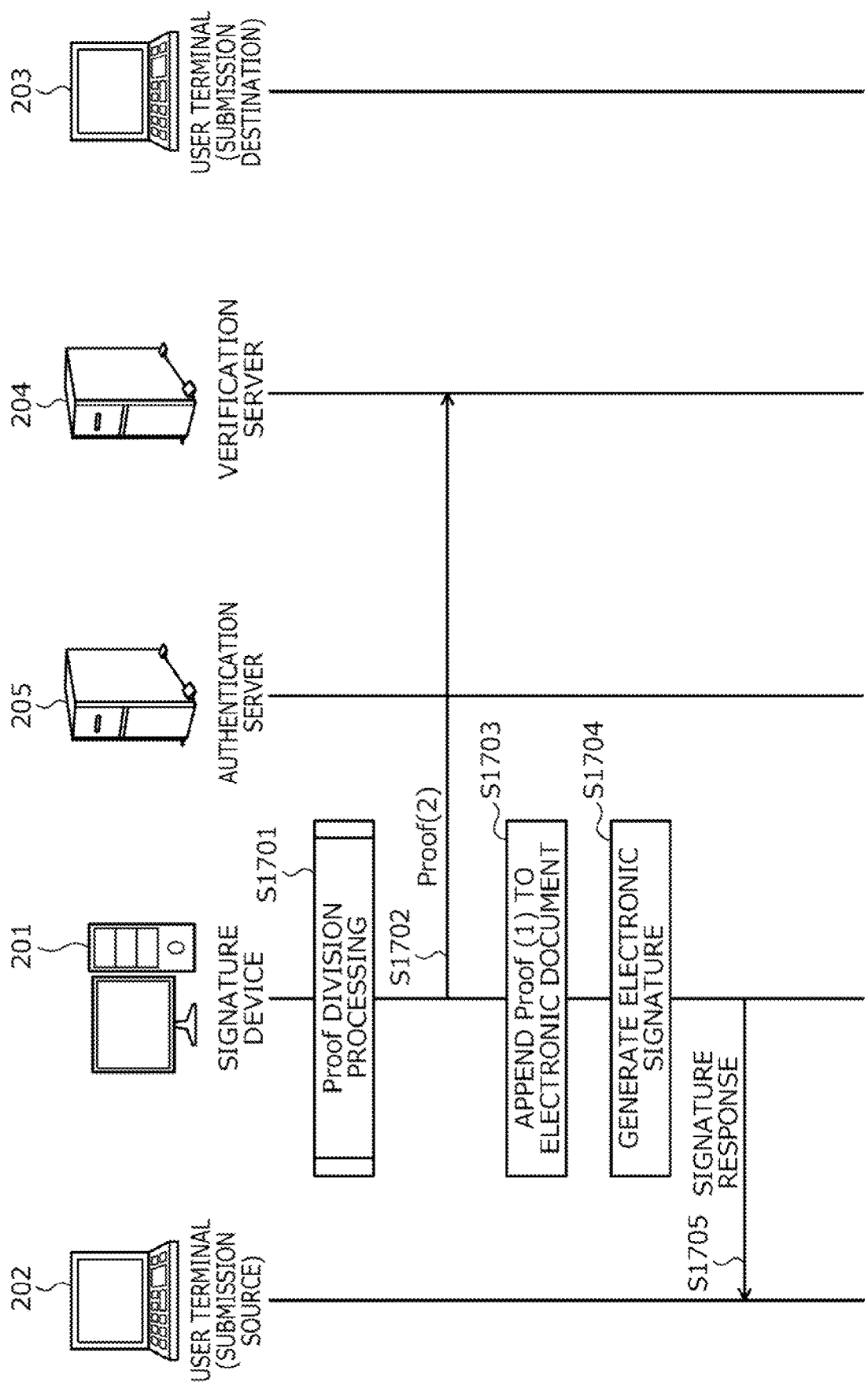

COMPUTER-READABLE RECORDING MEDIUM STORING INFORMATION PROCESSING PROGRAM, INFORMATION PROCESSING METHOD, INFORMATION PROCESSING DEVICE, AND INFORMATION PROCESSING SYSTEM

CROSS-REFERENCE TO RELATED APPLICATION

This application is based upon and claims the benefit of priority of the prior Japanese Patent Application No. 2020-204679, filed on Dec. 10, 2020, the entire contents of which are incorporated herein by reference.

FIELD

The embodiments discussed herein are related to an information processing program, an information processing method, an information processing device, and an information processing system.

BACKGROUND

In recent years, a decentralized identifier (ID) distribution platform that distributes digitized identity information (ID information) as a certificate in a safe, secure, and easy manner with the consent of the person pertaining to the ID information has been attracting attention. As a use case of the ID distribution platform, for example, there is a case in which a document is sent with an electronic signature of an organization or a representative attached, and the authenticity of the document is verified on another party side using the electronic signature.

As prior art, there is a technique in which a terminal uses an electronic tally to generate a plurality of divided pieces of data from original data and transmits a part of the divided pieces of data to a certification server while transmitting the other part of the divided pieces of data to a preservation server, and the certification server generates certification information that certifies that the divided pieces of data have not been tampered with and generates proof information including the certification information and time information to store the divided pieces of data and the proof information in correlation with each other. Furthermore, there is a technique in which an electronic document forwarded from a client terminal is saved in an originality guarantee electronic saving device, and in response to an electronic document reference request forwarded from the client terminal, the applicable electronic document saved in the originality guarantee electronic saving device is read and forwarded to the client terminal.

Examples of the related art include as follows: Japanese Laid-open Patent Publication No. 2013-179569; and Japanese Laid-open Patent Publication No. 2004-013488.

SUMMARY

According to an aspect of the embodiments, a non-transitory computer-readable recording medium storing an information processing program that causes a computer to execute processing including: creating first partial certificate information and second partial certificate information from certificate information that includes attribute information of a signer and certification information configured to certify the attribute information, based on a data amount of an electronic document, in response to a signing request for the electronic document; generating an electronic signature for the electronic document and the first partial certificate information attaching the generated electronic signature to the electronic document and the first partial certificate information, and transmitting the electronic document and the first partial certificate information with the electronic signature attached to a submission source of the electronic document; and transmitting the second partial certificate information to a verification device that verifies authenticity of the certificate information of the signer, using another route different from a route that connects the submission source and a submission destination of the electronic document.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram illustrating a specific example of a credential;

FIG. 8 is an explanatory diagram illustrating a specific example of certification information;

FIG. 15 is an explanatory diagram illustrating an operation example when ordering the verification of the proof;

FIG. 16 is a sequence diagram (part 1) illustrating an example of a verification processing procedure of the information processing system 200;

FIG. 17 is a sequence diagram (part 2) illustrating an example of a verification processing procedure of the information processing system 200;

DESCRIPTION OF EMBODIMENTS

However, in the prevalent techniques, when verifying the authenticity of an electronic document, it is difficult to confirm the attributes of the signer and to verify the correctness of the attributes. For example, it is conceivable to enclose a certificate that certifies the attributes of the signer into the electronic document, but there is a disadvantage that the amount of information of the certificate with respect to the electronic document increases, which leads to the deterioration of the transmission efficiency.

In one aspect, it is an object of the present embodiments to suppress the amount of information of a certificate appended to an electronic document and avoid the deterioration of the transmission efficiency.

Hereinafter, embodiments of an information processing program, an information processing method, an information processing device, and information processing system will be described in detail with reference to the drawings.

EMBODIMENTS

Figure 1:
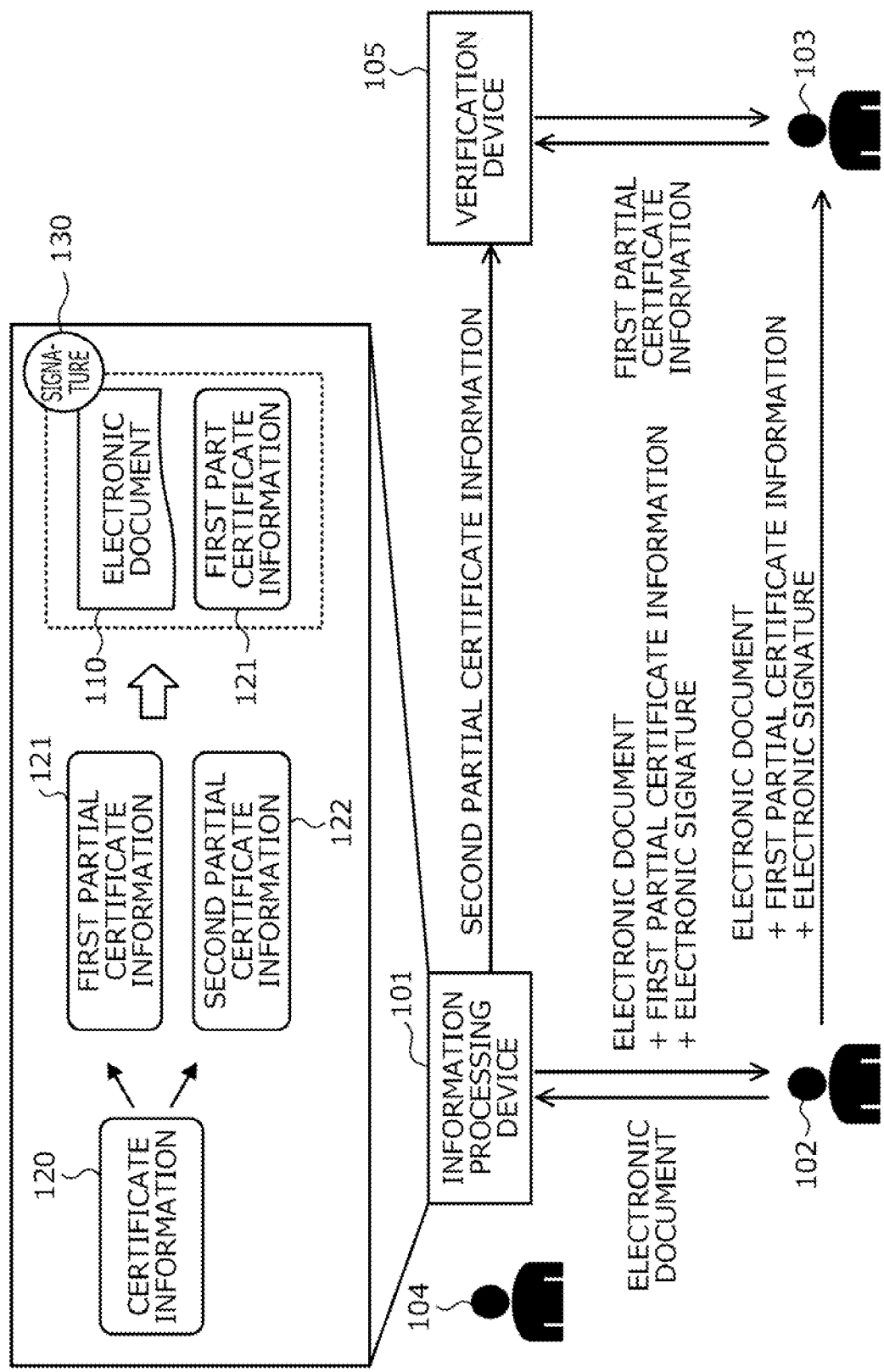
FIG. 1 is an explanatory diagram illustrating an example of an information processing method according to an embodiment.

FIG. 1 is an explanatory diagram illustrating an example of an information processing method according to an embodiment. In FIG. 1, an information processing device 101 is a computer that makes it possible to confirm the attributes of the signer and to verify the correctness of the attributes when verifying the authenticity of an electronic document using an electronic signature. The electronic document is content used in an electronic form.

For example, the electronic document is a document or an image created by various applications. Furthermore, the electronic document may be a paper document or the like read by a scanner and saved as electronic data. The electronic signature is information for certifying the authenticity (legitimacy) of data (electronic document). The electronic signature may be implemented, for example, by utilizing a public key cryptosystem.

Here, when verifying the authenticity of an electronic document using an electronic signature, it is sometimes desired to ensure the correctness of the electronic document after grasping the attributes of the signer. For example, it is assumed that, when issuing an invoice for a certain company, the signature of the certain company's representative is needed. In this case, if it is not possible to confirm the attributes of the signer, it can be confirmed that the invoice has not been tampered with, but it is not possible to know whether it is really the signature of the representative.

This means that it is not possible to confirm the attributes of the signer or verify the correctness of the attributes only by attaching the electronic signature. Therefore, for example, it is conceivable to enclose certificate information that certifies the attributes of the signer into the electronic document. The certificate information includes attribute information of the signer and certification information for certifying the attribute information.

The attribute information is information relating to the unique properties and features possessed by a human or a thing (name, gender, age, occupation, job title, and the like). The certification information is information for certifying the attribute information and includes, for example, a plurality of variable groups. The certificate information is verified using, for example, a protocol called zero-knowledge proof on the basis of the attribute information, the certification information, and a public key of the issuer of the certificate.

However, the amount (size) of data of the certification information tends to be large. For example, the data amount of the certification information is often about 10 times the data amount of the original electronic document or the attribute information. Therefore, when the certificate information is attached to the electronic document, the data amount with respect to the electronic document becomes large, and the communication overhead increases while the transmission efficiency decreases.

Thus, the present embodiment will describe an information processing method that makes it possible to confirm the attributes of the signer and verify the correctness of the attributes when verifying the authenticity of an electronic document, while suppressing the amount of information of a certificate appended to the electronic document and avoiding the deterioration of the transmission efficiency. Processing example of the information processing device 101 will be described below.

(1) The information processing device 101 creates first partial certificate information and second partial certificate information from certificate information, based on the data amount of an electronic document in response to a signing request for the electronic document. Here, the signing request requests that an electronic signature be attached to an electronic document. The signing request contains an electronic document to be signed.

The certificate information includes attribute information of the signer and certification information for certifying the attribute information. The certificate information is, for example, a proof created based on attribute certificate information (credential) of the signer issued by the authentication authority. The attribute certificate information is information that indicates an attribute certificate of a user (signer).

The attribute certificate information is, for example, information for certifying that the user is a legitimate person linked to identity information. The identity information is, for example, a set of attributes (attributes and attribute values) that define a user. For example, the attributes include the name, address, date of birth, social security and tax number, age, occupation, job title, career, and the like.

The authentication authority is an authority that manages the identity information of the user (signer) and is, for example, a particular company (authentication company) or a particular department within a company. In more detailed description, for example, the certificate information may reveal a part of information of the attribute certificate information, or may unreveal a part of information of the attribute certificate information, or may certify whether the attribute certificate information satisfies a certain condition.

For example, the information processing device 101 divides the certificate information into the attribute information and the certification information and generates a summary value of the attribute information and a summary value of the certification information. The summary value is, for example, a hash value generated using a hash function (cryptographic one-way hash function) on data (the attribute information and the certification information).

The hash value generated using the cryptographic one-way hash function has features that the hash value is given as the sole information that can only be generated from the generation source data, and it is not possible to restore the original data from the generated hash value. Furthermore, according to the hash function, for example, data can be compressed to a fixed size (length).

Then, the information processing device 101 divides the attribute information, the certification information, the summary value of the attribute information, and the summary value the certification information into the first partial certificate information and the second partial certificate information such that the ratio of the data amount of the first partial certificate information to the data amount of the electronic document is equal to or less than a predetermined value. The predetermined value can be set to any value and, for example, set to a value of about 20%.

The example in FIG. 1 supposes a case where first partial certificate information 121 and second partial certificate information 122 are created from certificate information 120 in response to the signing request from a submission source 102 of an electronic document 110 such that the ratio of the data amount of the first partial certificate information 121 to the data amount of the electronic document 110 is equal to or less than a predetermined value.

(2) The information processing device 101 generates an electronic signature for the first partial certificate information and the electronic document. For example, the information processing device 101 appends the first partial certificate information to the electronic document and, based on a private key of the signer, generates an electronic signature for the electronic document to which the first partial certificate information is appended.

In more detailed description, for example, the information processing device 101 uses a hash function to calculate a hash value of the electronic document to which the first partial certificate information is appended. Then, the information processing device 101 generates an electronic signature by encrypting the calculated hash value using the private key of the signer.

In the example in FIG. 1, an electronic signature 130 is generated for the electronic document 110 to which the first partial certificate information 121 is appended, based on the private key of a signer 104. Note that the information processing device 101 may generate an electronic signature for each of the electronic document 110 and the first partial certificate information 121 based on the private key of the signer 104.

(3) The information processing device 101 attaches the generated electronic signature to the electronic document and the first partial certificate information and transmits the electronic document and the first partial certificate information with the electronic signature attached, to the submission source of the electronic document. Furthermore, the information processing device 101 transmits the second partial certificate information to a verification device 105 using another route different from a route connecting the submission source and the submission destination of the electronic document.

The submission source of the electronic document corresponds to a sender (for example, an employee of a certain company A) who sends the electronic document (for example, an invoice of the certain company A) to the submission destination. The submission destination of the electronic document corresponds to a recipient (for example, an accountant of the certain company A or an employee of a billing company B) who receives the electronic document sent from the submission source. The verification device 105 corresponds to a verifier that verifies the authenticity of the signer's certificate information (attribute information).

The information processing device 1131 and the verification device 105 are connected by another route different from the route connecting the submission source of the electronic document and the submission destination of the electronic document. The another route is provided, for example, by an ID distribution platform. The ID distribution platform is a platform for distributing digitized identity information in a safe, secure, and easy manner.

The verification device 105 receives the first partial certificate information from the submission destination of the electronic document and receives the second partial certificate information from the information processing device 101. Then, the verification device 105 verifies the authenticity of the certificate information based on the received first partial certificate information and the received second partial certificate information.

In the example in FIG. 1, the electronic signature 130 is attached to the electronic document 110 to which the first partial certificate information 121 is appended, and the electronic document 110 with the electronic signature 130 attached is transmitted to the submission source 102 of the electronic document 110. Furthermore, the second partial certificate information 122 is transmitted to the verification device 105 using another route different from the route connecting the submission source 102 and a submission destination 103 of the electronic document 110.

As described above, according to the information processing device 101, when verifying the authenticity of an electronic document using an electronic signature, it may become possible to confirm the attributes of the signer and also to verify the correctness of the attributes. In addition, by dividing the certificate information into two, the amount of information of the certificate appended to the electronic document may be suppressed.

In the example in FIG. 1, when verifying the authenticity of the electronic document 110, it becomes possible to confirm the attributes of the signer and the correctness of the attributes at the submission destination 103 of the electronic document 110. Furthermore, by dividing the certificate information 120 into two, it is possible to suppress the amount of information of the certificate appended to the electronic document 110 and to avoid the deterioration of the transmission efficiency.

(System Configuration Example of Information Processing System 200)

Next, a system configuration example of an information processing system 200 according to the embodiment will be described. The information processing system 200 is an example of a computer system including the information processing device 101 illustrated in FIG. 1. The information processing system 200 is applied, for example, to an ID distribution platform that distributes digitized identity information (ID information) as a certificate with the consent of the person pertaining to the ID information.

In the following description, a case where the information processing device 101 illustrated in FIG. 1 is applied to a signature device 201 in the information processing system 200 will be described as an example. Furthermore, the attribute certificate information of the signer will be sometimes denoted as "credential", and the certificate information created from the attribute certificate information will be sometimes denoted as "proof".

Figure 2:
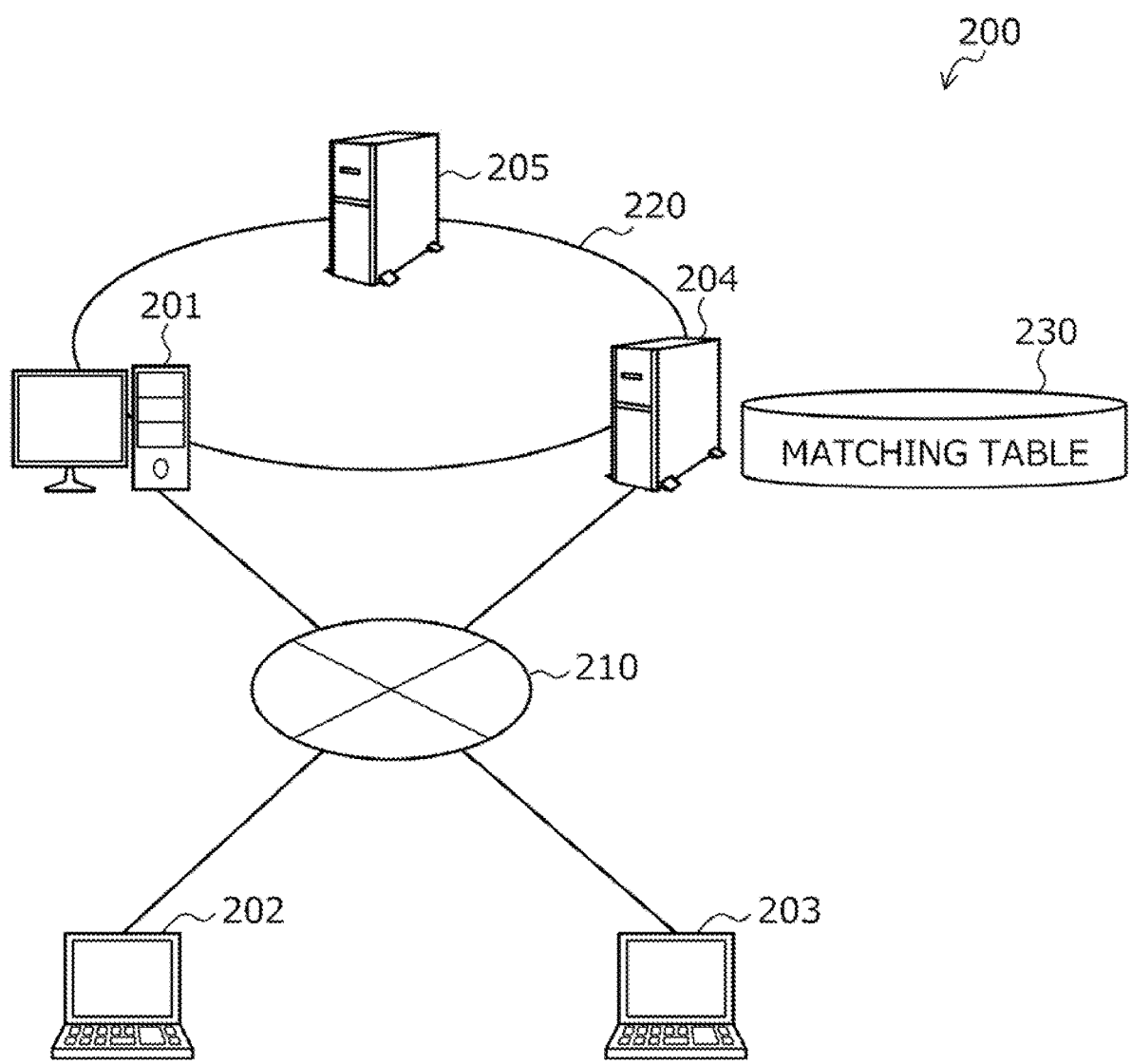
FIG. 2 is an explanatory diagram illustrating a system configuration example of an information processing system 200.

FIG. 2 is an explanatory diagram illustrating a system configuration example of the information processing system 200. In FIG. 2, the information processing system 200 includes the signature device 201, a user terminal 202, a user terminal 203, a verification server 204, and an authentication server 205. In the information processing system 200, the signature device 201, the user terminal 202, the user terminal 203, and the verification server 204 are connected via a wired or wireless network 210.

For example, the network 210 is a local area network (LAN), a wide area network (WAN), the Internet, or the like. Furthermore, the signature device 201, the verification server 204, and the authentication server 205 are included in an ID distribution platform 220. In the ID distribution platform 220, the signature device 201, the verification server 204, and the authentication server 205 are connected via a dedicated network. The ID distribution platform 220 is one platform and is implemented by, for example, a cloud.

Here, the signature device 201 is a computer that signs (electronically signs) an electronic document. The signature device 201 is, for example, a personal computer (PC) used by the signer.

The user terminal 202 is a computer used by a user who is a submission source (sender) of an electronic document. The user terminal 203 is a computer used by a user who is a submission destination (recipient) of an electronic document. For example, the user terminals 202 and 203 are PCs, tablet PCs, or the like. The submission source 102 illustrated in FIG. 1 corresponds to, for example, the user terminal 202. The submission destination 103 illustrated in FIG. 1 corresponds to, for example, the user terminal 203.

The verification server 204 is a computer that has a matching table 230 and verifies the authenticity of the signer's proof (certificate information). The verification device 105 illustrated in FIG. 1 corresponds to, for example, the verification server 204. An example of the contents stored in the matching table 230 will be described later with reference to FIG. 5.

The authentication server 205 is a computer that manages the credential (attribute certificate information) of the user (signer). The authentication server 205 is, for example, a server of an authentication company (authentication authority). A specific example of the credential will be described later with reference to FIG. 6. Furthermore, a specific example of the proof created from the credential will be described later with reference to FIG. 7.

Note that, in the example in FIG. 2, only one signature device 201, user terminal 202 (submission source), user terminal 203 (submission destination), verification server 204, and authentication server 205 are individually depicted, but the present embodiment is not limited to this example. For example, the information processing system 200 may include a plurality of signature devices 201, user terminals 202 (submission sources), user terminals 203 (submission destinations), verification servers 204, and authentication servers 205 individually.

(Hardware Configuration Example of Signature Device 201)

Next, a hardware configuration example of the signature device 201 will be described.

Figure 3:
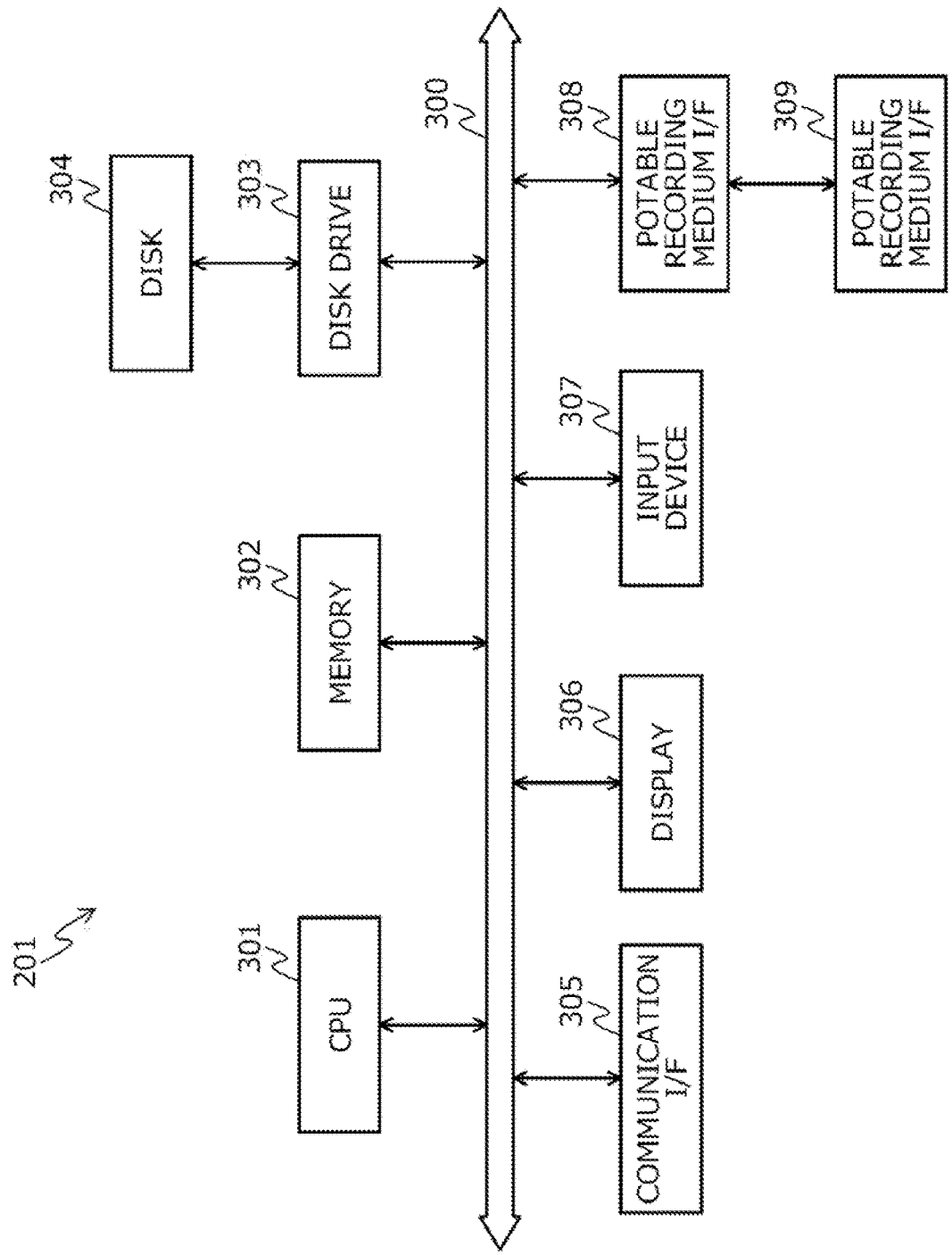
FIG. 3 is a block diagram illustrating a hardware configuration example of a signature device 201.

FIG. 3 is a block diagram illustrating a hardware configuration example of the signature device 201. In FIG. 3, the signature device 201 includes a central processing unit (CPU) 301, a memory 302, a disk drive 303, a disk 304, a communication interface (I/F) 305, a display 306, an input device 307, a portable recording medium I/F 308, and a portable recording medium 309. Furthermore, the individual components are connected to each other by a bus 300.

Here, the CPU 301 is in charge of overall control of the signature device 201. The CPU 301 may include a plurality of cores. For example, the memory 302 is a storage unit that includes a read only memory (ROM), a random access memory (RAM), a flash ROM, and the like. For example, the flash ROM or the ROM stores various programs, and the RAM is used as a work area for the CPU 301. A program stored in the memory 302 is loaded into the CPU 301 to cause the CPU 301 to execute coded processing.

The disk drive 303 controls reading and writing of data from and into the disk 304 under the control of the CPU 301. The disk 304 stores data written under the control of the disk drive 303. Examples of the disk 304 include a magnetic disk and an optical disc.

The communication I/F 305 is connected to a network (for example, the network 210 and the ID distribution platform 220 illustrated in FIG. 2) through a communication line and is connected to external computers (for example, the user terminal 202, the verification server 204, and the authentication server 205) via the network. Then, the communication I/F 305 is in charge of an interface between the network and the inside of the own device and controls input and output of data from an external device.

The display 306 is a display device that displays data such as a document, an image, or function information, as well as a cursor and icons or tool boxes. For example, a liquid crystal display, an organic electroluminescence (EL) display, or the like can be adopted as the display 306.

The input device 307 has keys for inputting characters, numbers, various instructions, and the like and inputs data. The input device 307 may be a keyboard, a mouse, or the like, or may be a touch-panel input pad, a numeric keypad, or the like.

The portable recording medium I/F 308 controls reading and writing of data from and into the portable recording medium 309 under the control of the CPU 301. The portable recording medium 309 stores data written under the control of the portable recording medium I/F 308. Examples of the portable recording medium 309 include a compact disc (CD)-ROM, a digital versatile disk (DVD), and a universal serial bus (USB) memory.

Note that the signature device 201 may not include, for example, the disk drive 303, the disk 304, the portable recording medium I/F 308, or the portable recording medium 309 among the above-described components. Furthermore, the user terminals 202 and 203 illustrated in FIG. 2 can also be implemented by a hardware configuration similar to the hardware configuration of the signature device 201.

(Hardware Configuration Example of Verification Server 204)

Next, a hardware configuration example of the verification server 204 will be described.

Figure 4:
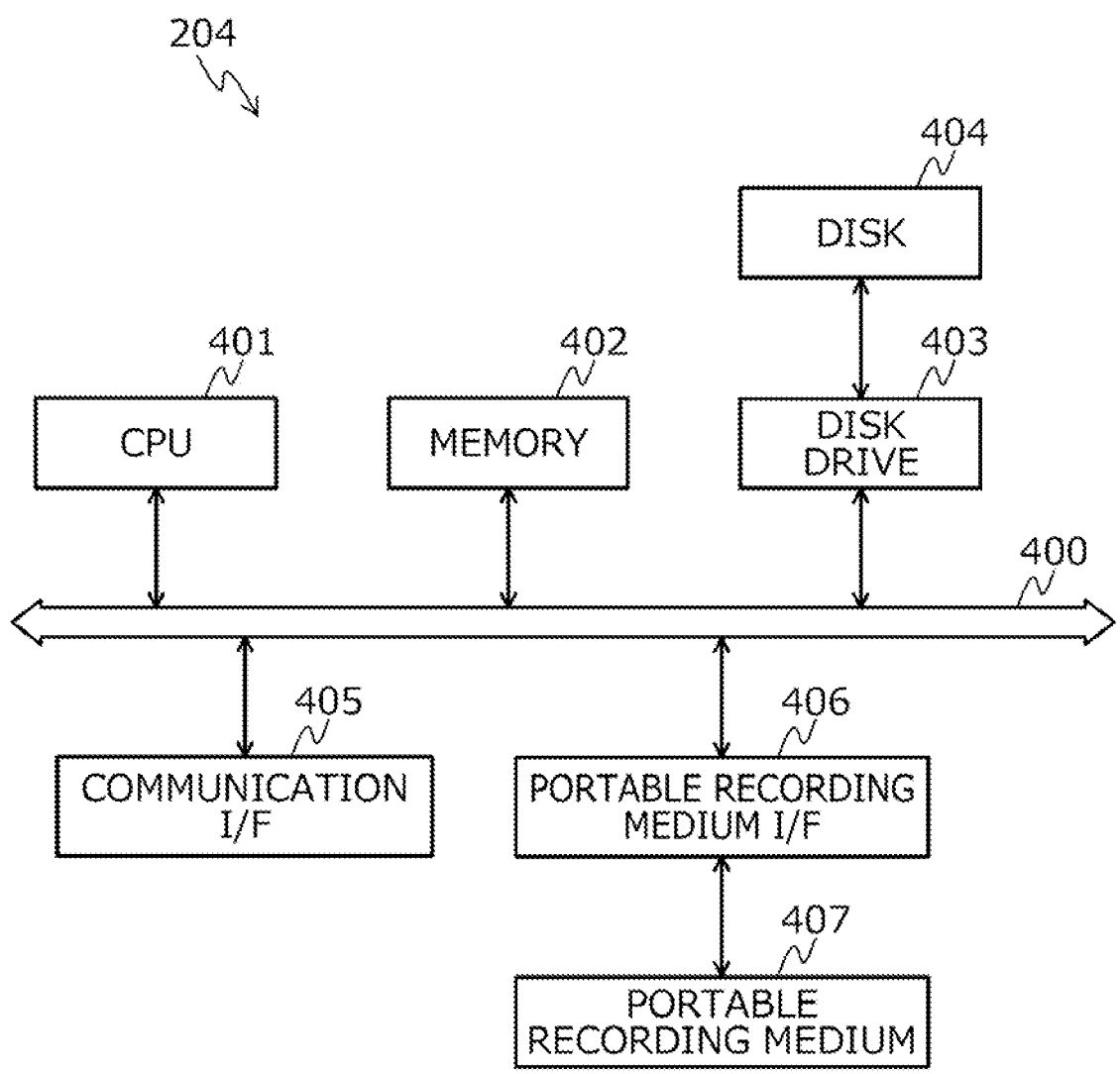
FIG. 4 is a block diagram illustrating a hardware configuration example of a verification server 204.

FIG. 4 is a block diagram illustrating a hardware configuration example of the verification server 204, In FIG. 4, the verification server 204 includes a CPU 401, a memory 402, a disk drive 403, a disk 404, a communication I/F 405, a portable recording medium I/F 406, and a portable recording medium 407. Furthermore, the individual components are connected to each other by a bus 400.

Here, the CPU 401 is in charge of overall control of the verification server 204. The CPU 401 may include a plurality of cores. For example, the memory 402 includes a ROM, a RAM, a flash ROM, and the like. For example, the flash ROM stores an operating system (OS) program, the ROM stores application programs, and the RAM is used as a work area for the CPU 401. A program stored in the memory 402 is loaded into the CPU 401 to cause the CPU 401 to execute coded processing.

The disk drive 403 controls reading and writing of data from and into the disk 404 under the control of the CPU 401. The disk 404 stores data written under the control of the disk drive 403. Examples of the disk 404 include a magnetic disk and an optical disc.

The communication I/F 405 is connected to a network (for example, the network 210 and the ID distribution platform 220 illustrated in FIG. 2) through a communication line and is connected to external computers (for example, the signature device 201 and the user terminal 203 illustrated in FIG. 2) via the network. Then, the communication I/F 405 is in charge of an interface between the network and the inside of the device and controls input and output of data from an external computer. For example, a modem, a LAN adapter, or the like can be adopted as the communication I/F 405.

The portable recording medium I/F 406 controls reading and writing of data from and into the portable recording medium 407 under the control of the CPU 401. The portable recording medium 407 stores data written under the control of the portable recording medium I/F 406.

Note that, for example, the verification server 204 may include an input device, a display, or the like, in addition to the above-described components. Furthermore, the verification server 204 may not include, for example, the disk drive 403, the disk 404, the portable recording medium I/F 406, or the portable recording medium 407 among the above-described components. In addition, the authentication server 205 illustrated in FIG. 2 can also be implemented by a hardware configuration similar to the hardware configuration of the verification server 204.

(Contents Stored in Matching Table 230)

Next, the contents stored in the matching table 230 included in the verification server 204 will be described with reference to FIG. 5. The matching table 230 is implemented by, for example, a storage device such as the memory 402 and the disk 404 of the verification server 204 illustrated in FIG. 4.

Figure 5:
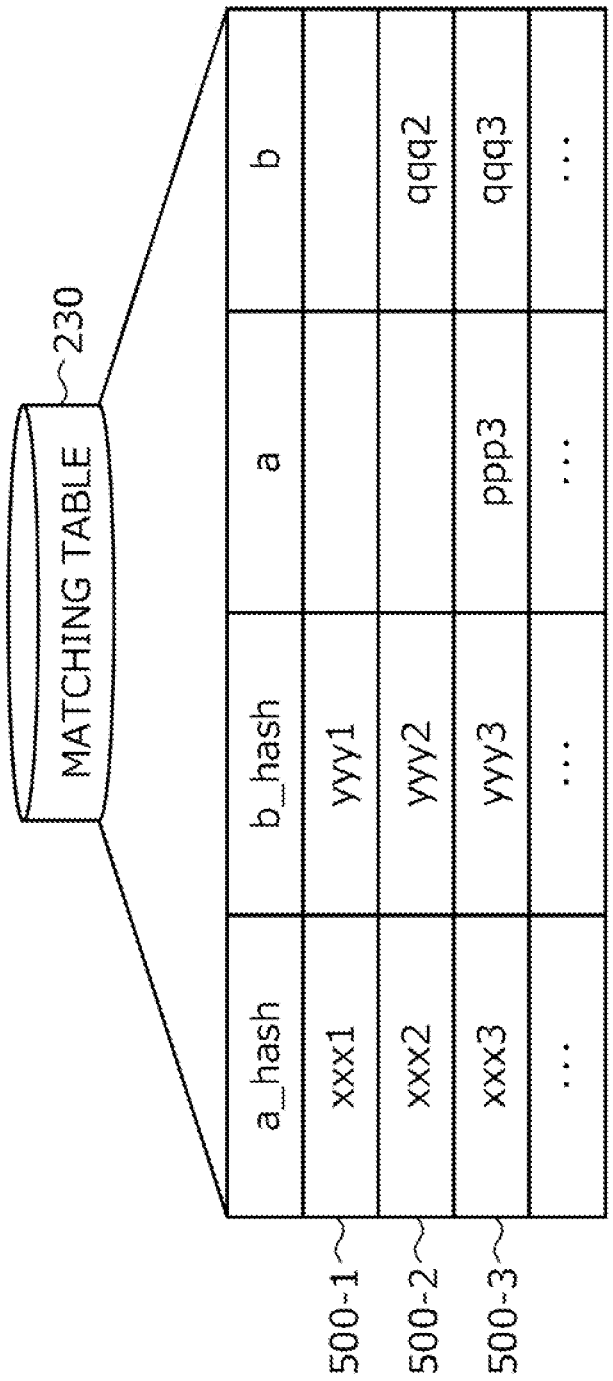
FIG. 5 is an explanatory diagram illustrating an example of the contents stored in a matching table 230.

FIG. 5 is an explanatory diagram illustrating an example of the contents stored in the matching table 230. In FIG. 5, the matching table 230 has fields of a_hash, b_hash, a, and h and, by setting information in each field, stores pieces of matching data (for example, matching data 500-1 to matching data 500-3) as records.

Here, the field a_hash has a hash value of the attribute information included in the proof. The field b_hash has a hash value of the certification information included in the proof. The field a has the attribute information included in the proof. The field b has the certification information included in the proof.

For example, the matching data 500-1 indicates a_hash "xxx1" and b_hash "yyy1". Each of the fields a and b of the matching data 500-1 is blank.

(Specific Example of Credential)

Next, a specific example of the credential will be described with reference to FIG. 6.

FIG. 6 is an explanatory diagram illustrating a specific example of the credential. In FIG. 6, a credential 600 is an example of a credential (attribute certificate information) issued from the authentication server 205. The credential 600 is information that certifies the attributes of the signer.

Here, as the attributes of the signer, the job title "president", the name "Fuji Taro", the address "XXX, Nakahara-ku, Kawasaki city", the date of birth "1988/1/1", the social security and tax number "123456 . . . ", the age "32" are indicated. Furthermore, the signature "XXXX" is attached to the credential 600 with the private key of the issuer (for example, the authentication company) based on the electronic signature mechanism.

(Specific Example of Proof)

Next, a specific example of the proof will be described with reference to FIG. 7.

Figure 7:
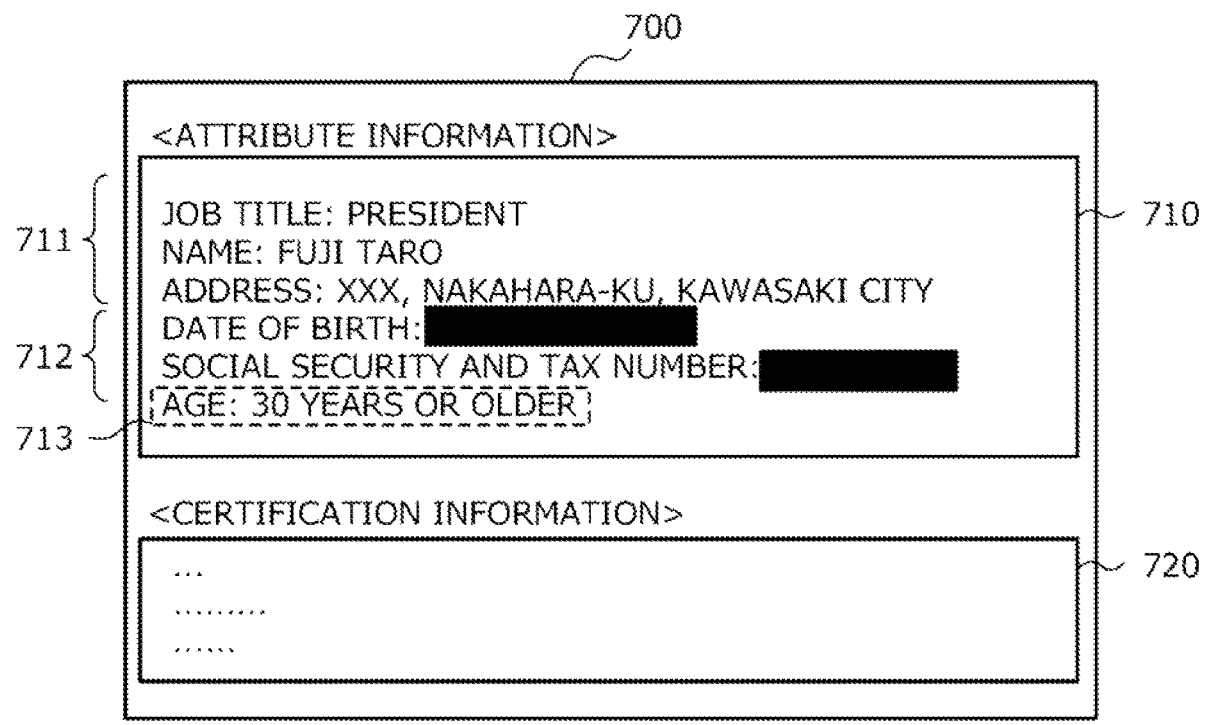
FIG. 7 is an explanatory diagram illustrating a specific example of a proof.

FIG. 7 is an explanatory diagram illustrating a specific example of a proof. In FIG. 7, a proof 700 is an example of a proof (certificate information) created from the credential 600 illustrated in FIG. 6. The proof 700 includes attribute information 710 and certification information 720.

The attribute information 710 includes revealed attribute information 711, unrevealed attribute information 712, and condition certification information 713. The revealed attribute information 711 is information in the credential 600 to be revealed. The unrevealed attribute information 712 is information in which attributes in the credential 600 that do not need to be revealed are unrevealed by blackening processing.

The condition certification information 713 is information (range certification) that certifies that the condition that the age contained in the credential 600 is 30 years or older is satisfied. The certification information 720 is information (a plurality of variable groups) for certifying the attribute information 710. A specific example of the certification information 720 will be described later with reference to FIG. 8.

FIG. 8 is an explanatory diagram illustrating a specific example of the certification information. In FIG. 8, certification information 800 (for example, corresponding to the certification information 720 illustrated in FIG. 7) includes a group of responses for zero-knowledge proof (ZKP). The element primary proof has a group of responses for ZKP regarding the attributes. The element revealed attributes indicate revealed attributes.

The elements name #1: value #1 and the like indicate the values of individual revealed attributes. The number of bits of the values of the individual revealed attributes depend on the values of the individual revealed attributes. The element unrevealed attributes indicates unrevealed attributes. The elements mj_hat #1 and the like indicate responses for ZKP of individual unrevealed attributes. The number of bits of the responses for ZKP of the individual unrevealed attributes is, for example, 592 [bit].

The element credential_siganture_ZKP indicates responses for ZKP of the signature (A, v, e) in the credential. The number of bits of credential_siganture_ZKP is, for example, 5564 [bit] (a_prime: 2048 [bit], e_hat 456 [bit], v_hat: 3060 [bit]).

The element predicate_attribute indicates condition certification. The elements u_hat1,u_hat4 and the like indicate responses for ZKP for each condition certification. The number of bits of predicate_attribute is, for example, 8515 [bit] (u_hat1,u_hat4: 2368 [bit], r_hat1,r_hat4: 2388 [hit], r_hat_delta: 672 [bit], alfa_hat: 2787 [bit]).

The element non_revoc_proof indicates a response for ZKP of non-revocation certification. The number of bits of non_revoc_proof (x_list) is, for example, 14336 [bit]. The element aggregated_proof indicates a challenge hash. The number of bits of aggregated_proof (c_hash) is, for example, 256 [bit].

According to the certification information 800, the correctness of the certification attribute may be verified by the zero-knowledge proof (ZKP) protocol from the ZKP response and the challenge hash.

(Functional Configuration Example of Signature Device 201)

Figure 9:
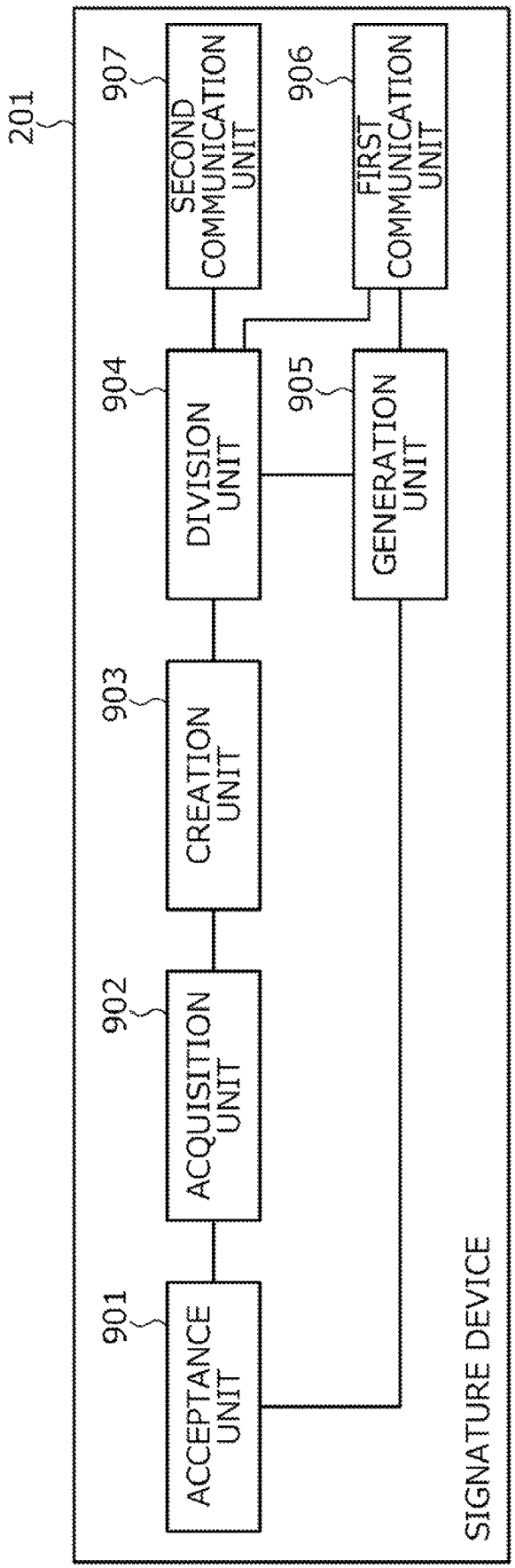
FIG. 9 is a block diagram illustrating a functional configuration example of the signature device 201.

FIG. 9 is a block diagram illustrating a functional configuration example of the signature device 201. In FIG. 9, the signature device 201 includes an acceptance unit 901, an acquisition unit 902, a creation unit 903, a division unit 904, a generation unit 905, a first communication unit 906, and a second communication unit 907. The acquisition unit 902 to the second communication unit 907 have functions serving as a control unit; for example, the functions of these units are implemented by the CPU 301 executing a program stored in a storage device such as the memory 302, the disk 304, or the portable recording medium 309, or by the communication I/F 305 illustrated in FIG. 3. The processing result of each functional unit is stored in, for example, a storage device such as the memory 302 or the disk 304.

The acceptance unit 901 accepts a signing request for an electronic document. The signing request requests that an electronic signature be attached to an electronic document. The signing request contains an electronic document to be signed. In the following description, an electronic document to be signed will be sometimes denoted as "electronic document D".

For example, the acceptance unit 901 accepts the signing request for the electronic document D by receiving the signing request from the user terminal 202 illustrated in FIG. 2. Furthermore, the acceptance unit 901 may accept the signing request for the electronic document D in accordance with an operation input from a user using the input device 307 illustrated in FIG. 3.

The acquisition unit 902 acquires the credential (attribute certificate information) of the signer issued by the authentication authority. For example, the acquisition unit 902 acquires the credential 600 (refer to FIG. 6) from the authentication server 205 (for example, an authentication company) illustrated in FIG. 2 by way of the ID distribution platform 220 in response to the signing request for the electronic document D.

However, the signer's credential may be acquired in advance, for example, prior to the signing request for the electronic document D.

The creation unit 903 creates the signer's proof (certificate information) based on the signer's credential. The proof includes attribute information of the signer and certification information for certifying the attribute information. The attribute information includes, for example, at least one of information on an attribute included in the credential (revealed attribute), information in which information on an attribute included in the credential is unrevealed (unrevealed attribute), and information that certifies that information on an attribute included in the credential satisfies a particular condition (condition certification).

For example, the creation unit 903 creates the proof 700 (refer to FIG. 7) by unrevealing an attribute that does not need to be revealed or certifying whether a certain condition is satisfied, based on the acquired credential 600 in accordance with an operation input from the user using the input device 307.

Note that the signature device 201 may acquire the proof created on the basis of the credential from another computer, the portable recording medium 308, or the like.

The division unit 904 creates the first partial certificate information and the second partial certificate information from the proof (certificate information) based on the data amount of the electronic document D. In the following description, the first partial certificate information created from the proof will be sometimes denoted as "proof (1)", and the second partial certificate information created from the proof will be sometimes denoted as "proof (2)".

For example, the division unit 904 divides the proof into the attribute information and the certification information and generates a hash value of the attribute information and a hash value of the certification information. Then, the division unit 904 divides the attribute information, the certification information, the summary value of the attribute information, and the summary value the certification information into the proof (1) and the proof (2) such that the ratio of the data amount of the proof (1) to the data amount of the electronic document D is equal to or less than a predetermined value $\alpha$.

At this time, among a first combination (a, b), a second combination (a, b_hash), and a third combination (a_hash b_hash), the division unit 904 assigns, for example, the first combination (a, b) or the second combination (a, b_hash) as the proof (1) in preference to the third combination (a_hash, b_hash).

Furthermore, the division unit 904 may assign the first combination (a, b) as the proof in preference to the second combination (a, b_hash) and the third combination (a_hash, b_hash). In the above, the element a represents the attribute information. The element b represents the certification information. The element a_hash represents the hash value of the attribute information. The element b_hash represents the hash value of the certification information.

Here, the combination patterns of the proof (1) will be described with reference to FIG. 10.

Figure 10:
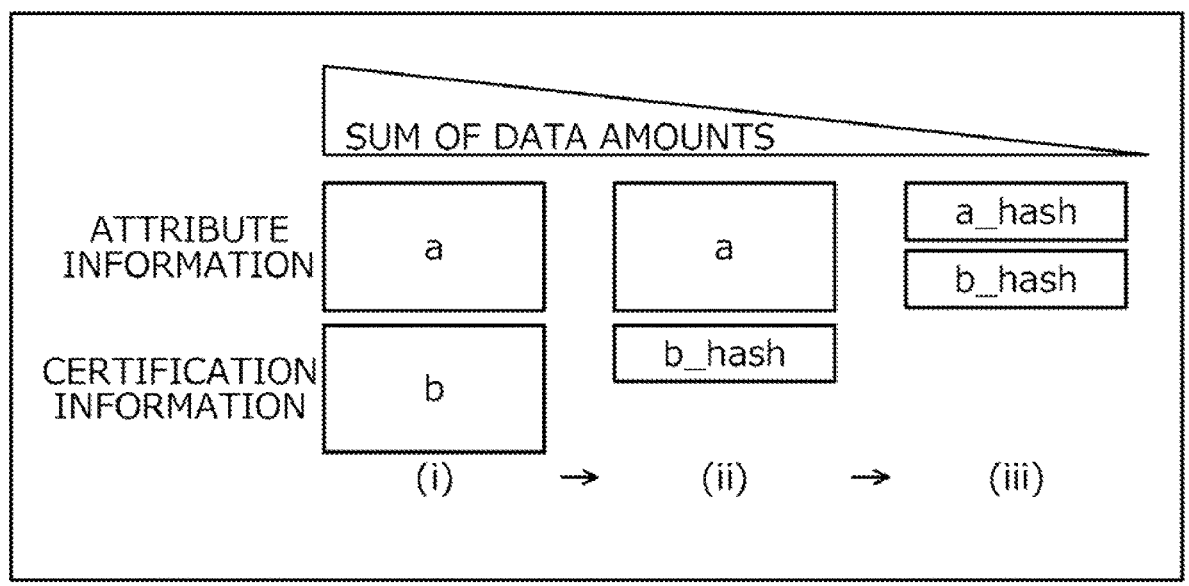
FIG. 10 is an explanatory diagram illustrating an example of combination patterns of a proof (1)

FIG. 10 is an explanatory diagram illustrating an example of combination patterns of the proof (1). In FIG. 10, the reference sign (i) indicates the first combination (a, b) made up of the attribute information and the certification information. The reference sign (ii) indicates the second combination (a, b_hash) made up of the attribute information and the hash value of the certification information. The reference sign (iii) indicates the third combination (a_hash, b_hash) made up of the hash value of the attribute information and the hash value of the certification information.

Although the sum of data amounts becomes larger in the order of "(iii)→(ii)→(i)", (i) and (ii) include the whole attribute information. The predetermined value $\alpha$ is assumed as "$\alpha=0.2$ (20%)". In this case, the division unit 904 preferentially assigns "(1)→(ii)→(iii)" in this order as the proof (1) such that the ratio of the data amount of the proof (1) to the data amount of the electronic document D is equal to or less than 02 (equal to or less than 20%), for example.

When the combination pattern of the proof (1) is i), the proof (2) is given as (a_hash, b_hash). When the combination pattern of the proof (1) is (ii), the proof (2) is given as (a_hash, b). When the combination pattern of the proof (1) is (iii), the proof (2) is given as (a, b).

The generation unit 905 generates an electronic signature for the electronic document D and the proof (1). For example, the generation unit 905 appends the proof (1) to the electronic document D. Next, the generation unit 905 calculates the hash value of the electronic document D to which the proof (1) is appended, using the hash function. Then, the generation unit 905 generates an electronic signature by encrypting the calculated hash value using the private key of the signer.

In the following description, the electronic signature for the electronic document D to which the proof (1) is appended will be sometimes denoted as "electronic signature S". Note that an example of generating the electronic signature S will be described later with reference to FIG. 13.

The first communication unit 906 attaches the generated electronic signature S to the electronic document D and the proof (1) and transmits the electronic document D and the proof (1) with the electronic signature S attached, to the submission source of the electronic document D. Here, the submission source of the electronic document D corresponds to the sender who sends the electronic document D to the submission destination. The submission source of the electronic document D is, for example, the user terminal 202, which is the requesting source of the signing request for the electronic document D.

For example, the first communication unit 906 attaches the electronic signature S to the electronic document D to which the proof (1) is appended. Then, the first communication unit 906 transmits a signature response to the user terminal 202, which is the requesting source, via the network 210. The signature response contains the electronic document D to which the proof (1) is appended and the electronic signature S attached to the electronic document D.

When receiving the signature response, for example, the user terminal 202 transmits the electronic document D to which the proof (1) is appended and the electronic signature S attached to the electronic document D, which are contained in the signature response, to the user terminal 203, which is the submission destination of the electronic document D, via the network 210. The submission destination of the electronic document corresponds to the recipient who receives the electronic document D sent from the submission source. For example, the transmission to the submission destination is performed by electronic mail or the like.

The second communication unit 907 transmits the proof (2) to the verification server 204 using another route different from the route connecting the submission source and the submission destination of the electronic document D. The verification server 204 is an example of a verification device that verifies the authenticity of the proof. For example, the second communication unit 907 transmits the proof (2) to the verification server 204 by way of the ID distribution platform 220, which is another route different from the network 210.

This allows a part of the proof (proof (2)) to be transmitted by way of the ID distribution platform 220, which may suppress the amount of information of the certificate with respect to the electronic document D and mitigate an increase in the overhead of communication via the network 210. Since the ID distribution platform 220 is implemented by a cloud or the like, an increase in the amount of communication due to the exchange of the proof (2) is less likely to be a disadvantage than with the network 210 such as the Internet.

(Functional Configuration Example of Verification Server 204)

Figure 11:
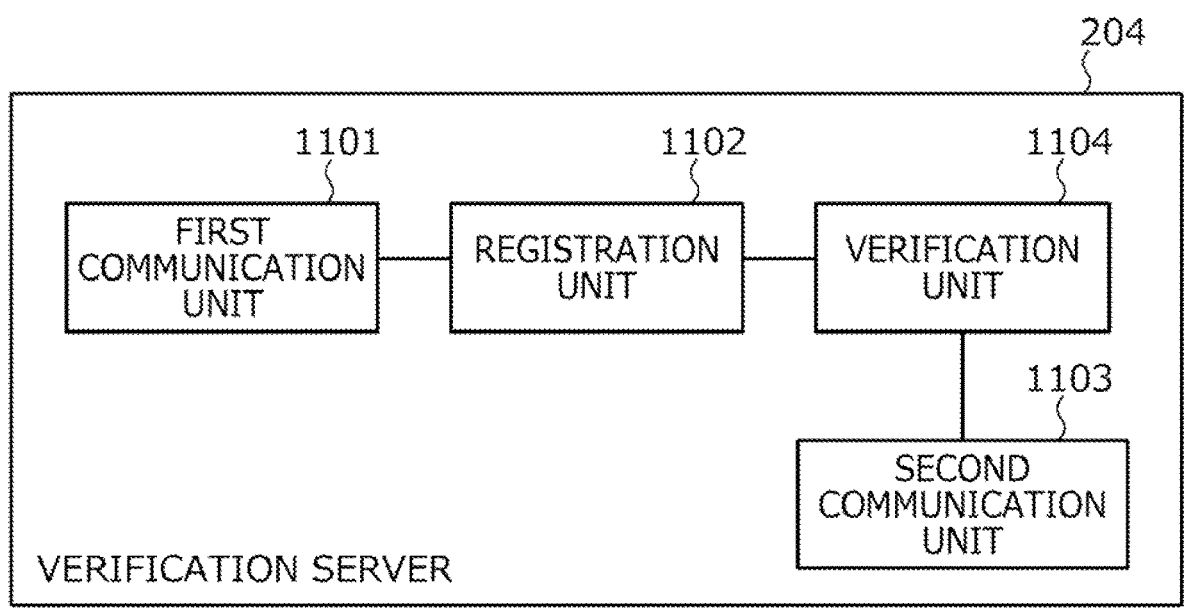
FIG. 11 is a block diagram illustrating a functional configuration example of the verification server 204.

FIG. 11 is a block diagram illustrating a functional configuration example of the verification server 204. In FIG. 11, the verification server 204 includes a first communication unit 1101, a registration unit 1102, a second communication unit 1103, and a verification unit 1104. The first communication unit 1101 to the verification unit 1104 have functions serving as a control unit; for example, the functions of these units are implemented by the CPU 401 executing a program stored in a storage device such as the memory 402, the disk 404, or the portable recording medium 407, or by the communication I/F 405 illustrated in FIG. 4. The processing result of each functional unit is stored in, for example, a storage device such as the memory 402 or the disk 404.

The first communication unit 1101 receives the proof (2) from the signature device 201 using another route different from the route connecting the submission source and the submission destination of the electronic document D. For example, the first communication unit 1101 receives the proof (2) from the signature device 201 by way of the ID distribution platform 220, which is another route different from the network 210.

When receiving the proof (2) from the signature device 201, the registration unit 1102 registers the matching data. For example, the proof (2) is assumed as (a_hash, b_hash). In this case, the registration unit 1102 registers a_hash and b_hash in the matching table 230 illustrated in FIG. 5 in association with each other. As a result, a new piece of matching data (for example, the matching data 500-1) is stored as a record.

Furthermore, the proof (2) is assumed as (a_hash, b). In this case, the registration unit 1102 calculates b_hash from b (certification information) using a hash function. However, the same function as the hash function used in the signature device 201 when creating the proof (1) and the proof (2) is used. Then, the registration unit 1102 registers a_hash, b_hash, and b in the matching table 230 in association with each other. As a result, a new piece of matching data (for example, the matching data 500-2) is stored as a record.

In addition, the proof (2) is assumed as (a, b). In this case, the registration unit 1102 calculates a_hash from a (attribute information) using a hash function. Furthermore, the registration unit 1102 calculates b_hash from b (certification information) using a hash function. Then, the registration unit 1102 registers a_hash, b_hash, a, and b in the matching table 230 in association with each other. As a result, a new piece of matching data (for example, the matching data 500-3) is stored as a record.

The second communication unit 1103 receives the proof (1) from the submission destination of the electronic document D. For example, the second communication unit 1103 receives a verification order from the user terminal 203 via the network 210. The verification order orders the verification of the authenticity of the signer's proof. The verification order contains the proof (1).

The verification order may further order the verification of the electronic document D. In this case, the verification order contains, for example, the electronic document D to which the proof (1) is appended and the electronic signature S attached to the electronic document D. For example, the verification server 204 may accept the authenticity verification order for the electronic document D along with the authenticity verification order for the proof from the user terminal 203.

The verification unit 1104 verifies the authenticity of the proof based on the proof (1) received from the submission destination of the electronic document D and the proof (2) received from the signature device 201. For example, the verification unit 1104 reconstructs the proof from the received proof (1) and proof (2) in response to the verification order from the submission destination of the electronic document D. Then, the verification unit 1104 verifies the proof from the attribute information and the certification information in the reconstructed proof.

The proof is verified, for example, on the basis of the attribute information (refer to FIG. 7), the certification information (refer to FIG. 8), and the public key of the credential issuer, using an existing protocol called zero-knowledge proof. In the zero-knowledge proof, the correctness of the certification attribute is verified by the zero-knowledge proof (ZKP) protocol from the ZKP response and the challenge hash.

In more detailed description, for example, the verification unit 1104 verifies the correctness of the certification attribute from a value obtained by performing arithmetic operations on the certification attribute and the challenge hash with an arithmetic method (for example, AND or OR) designated by the ZKP response, and the ZKP response ((the certification attribute and the challenge hash)→the ZKP response).

Note that an action example of the verification server 204 when verifying the authenticity of the proof will be described later with reference to FIGS. 14A to 14C.

Furthermore, the verification unit 1104 may verify the authenticity of the electronic document D using the electronic signature S. For example, when accepting the authenticity verification order for the electronic document D along with the authenticity verification order for the proof from the user terminal 203, the verification unit 1104 verifies the authenticity of the proof and at the same time, verifies the authenticity of the electronic document D.

In more detailed description, for example, the verification unit 1104 calculates the hash value of the electronic document D to which the proof (1) is appended. Next, the verification unit 1104 acquires the public key of the signer and decrypt the electronic signature S attached to the electronic document D using the acquired public key. Then, the verification unit 1104 compares the hash value obtained by the decryption with the calculated hash value.

Here, when the hash values coincide with each other, the verification unit 1104 regards that the verification has been approved (the verification has succeeded). The verification that has been approved indicates that the electronic document D (the electronic document D+the proof (1)) has correct information that has not been tampered with. On the other hand, when the hash values do not coincide with each other, the verification unit 1104 regards that the verification has been disapproved (the verification has failed). The verification that has been disapproved indicates that the electronic document D (the electronic document D+the proof (1)) does not have correct information. For example, if at least one of the electronic document D or the proof (1) is tampered with, the verification results in disapproval.

Note that an action example of the verification server 204 when verifying the authenticity of the electronic document D will be described later with reference to FIG. 13.

The second communication unit 1103 transmits the verification result to the submission destination (recipient) of the electronic document D. For example, the second communication unit 1103 transmits the verification result to the user terminal 203, which is the requesting source of the verification request, via the network 210. The verification result contains, for example, a verification result indicating whether the proof is correct (verification approved or verification disapproved).

Furthermore, the verification result contains, for example, the attribute information (or the attribute information and the certification information) included in the proof. This makes it possible to confirm the attributes of the signer and the authenticity of the attributes on the user terminal 203 (recipient).

However, when the combination pattern of the proof (1) is (i) or (ii), the attribute information may not be included in the verification result. When the combination pattern of the proof (1) is (i) or (ii), since the proof (1) includes the whole attribute information, the attribute information may be confirmed on the user terminal 203 (recipient) at a timing when the proof (1) is received, which is a timing before the verification of the proof.

Furthermore, when the authenticity verification order for the electronic document D has been accepted, the verification result further contains the verification result indicating whether the electronic document D is correct (verification approved or verification disapproved). However, the authenticity of the electronic document D may be verified on the user terminal 203 (recipient) using the electronic signature S.

(Action Example of Information processing System 200)

Next, an action example of the information processing system 200 will be described. Here, the sender (submission source) of the electronic document D is assumed as "an employee of a company A", and a case where the sender forwards the electronic document D to the company A (signature device 201), which is a company to which the sender belongs, to request a signature is supposed. The electronic document D is, for example, an invoice. Furthermore, the authentication authority that issues the credential is assumed as "authentication company X", and the verifier that verifies the electronic document D (electronic signature 5) and the proof is assumed as "verification company Y".

Figure 12:
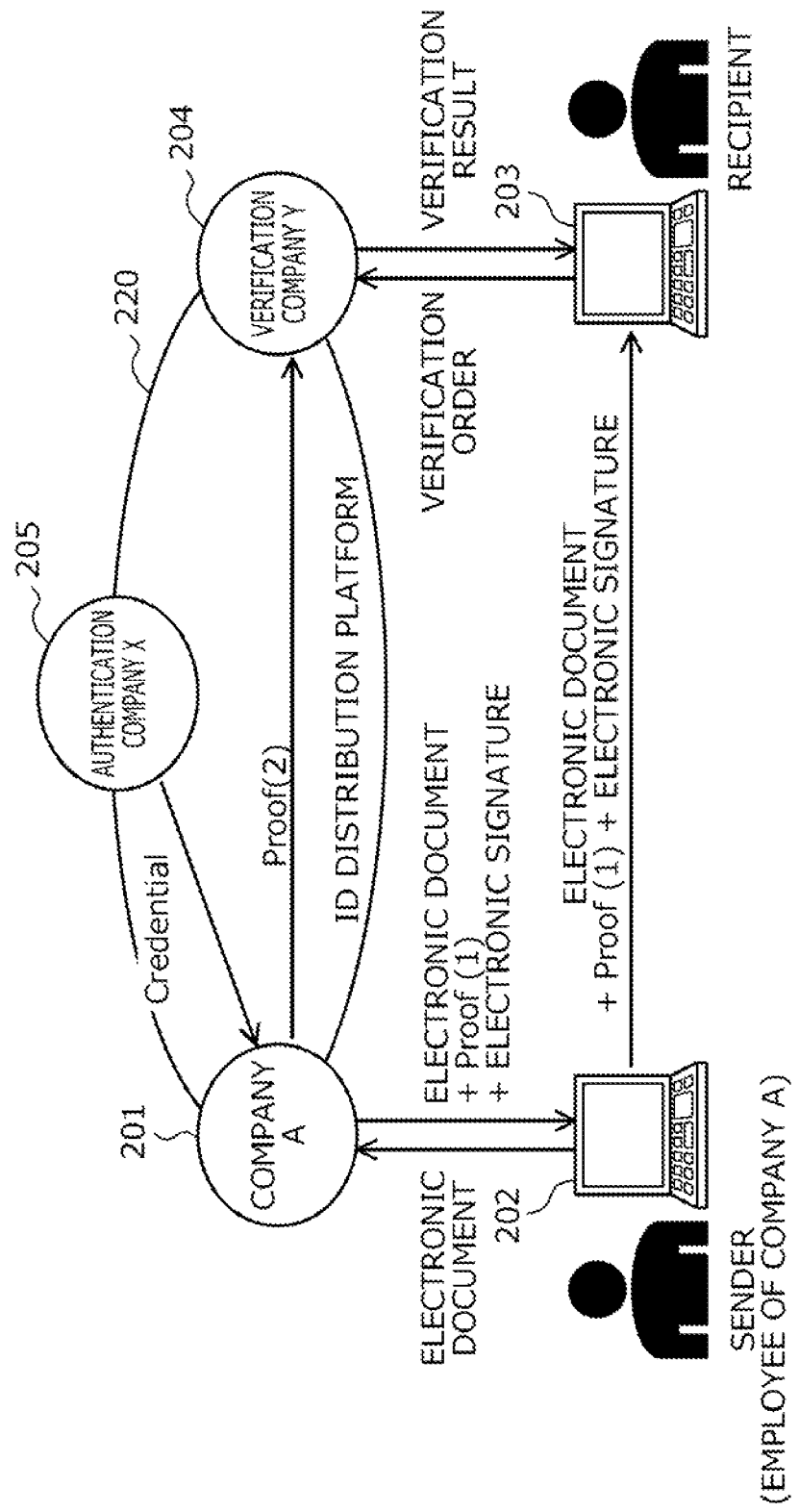
FIG. 12 is an explanatory diagram illustrating an action example of the information processing system 200.

FIG. 12 is an explanatory diagram illustrating an action example of the information processing system 200. In FIG. 12, the sender (user terminal 202) transmits a signing request containing the electronic document D to the company A (signature device 201). The company A (signature device 201) acquires the credential as the company A or the representative (signer) of the company A from the authentication company X (authentication server 205) in response to the signing request. However, the credential may be acquired in advance.

The company A (signature device 201) creates a proof from the credential and divides the proof into the proof (1) and the proof (2). The company A (signature device 201) transmits the proof (2) to the verification company Y (verification server 204) via the ID distribution platform 220.

The company A (signature device 201) appends the proof (1) to the electronic document D and places a signature (electronic signature 5) with the private key of the company A. An example of attaching the electronic signature S will be described later with reference to FIG. 13. The company A (signature device 201) transmits "electronic document D+proof (1)+electronic signature S" to the sender (user terminal 202).

The sender (user terminal 202) transmits "electronic document D+proof (1)+electronic signature S" to the recipient (user terminal 203) by electronic mail or the like via the network 210. The recipient (user terminal 203) transmits received "electronic document D+proof (1)+electronic signature 5" to the verification company Y (verification server 204) and orders the verification of the electronic document D (electronic signature 5) and the proof.

Note that an operation example when the recipient (user terminal 203) places a verification order to the verification company Y (verification server 204) will be described later with reference to FIG. 15.

The verification company Y (verification server 204) matches the proof (1) received from the recipient (user terminal 203) with the proof (2) received from the company A (signature device 201) to reconstruct the proof and verifies the proof. An example of reconstructing the proof will be described later with reference to FIGS. 14A to 14C.

Furthermore, the verification company Y (verification server 204) verifies the electronic signature S (electronic document D) based on the public key of the company A. An example of verifying the electronic signature S (electronic document D) will be described later with reference to FIG. 13. Then, the verification company Y (verification server 204) transmits the verification result to the recipient (user terminal 203). The verification result contains, for example, the verification result for the proof, the verification result for the electronic signature S (electronic document D), and the attribute information included in the proof.

This may make it possible to confirm the attributes of the signer (the company A or the representative of the company A) and also to verify the correctness of the attributes when verifying the authenticity of the electronic document D using the electronic signature S.

(Example of Attaching and Example of Verifying Electronic Signature 5)

Next, an example of attaching and an example of verifying the electronic signature S will be described with reference to FIG. 13.

Figure 13:
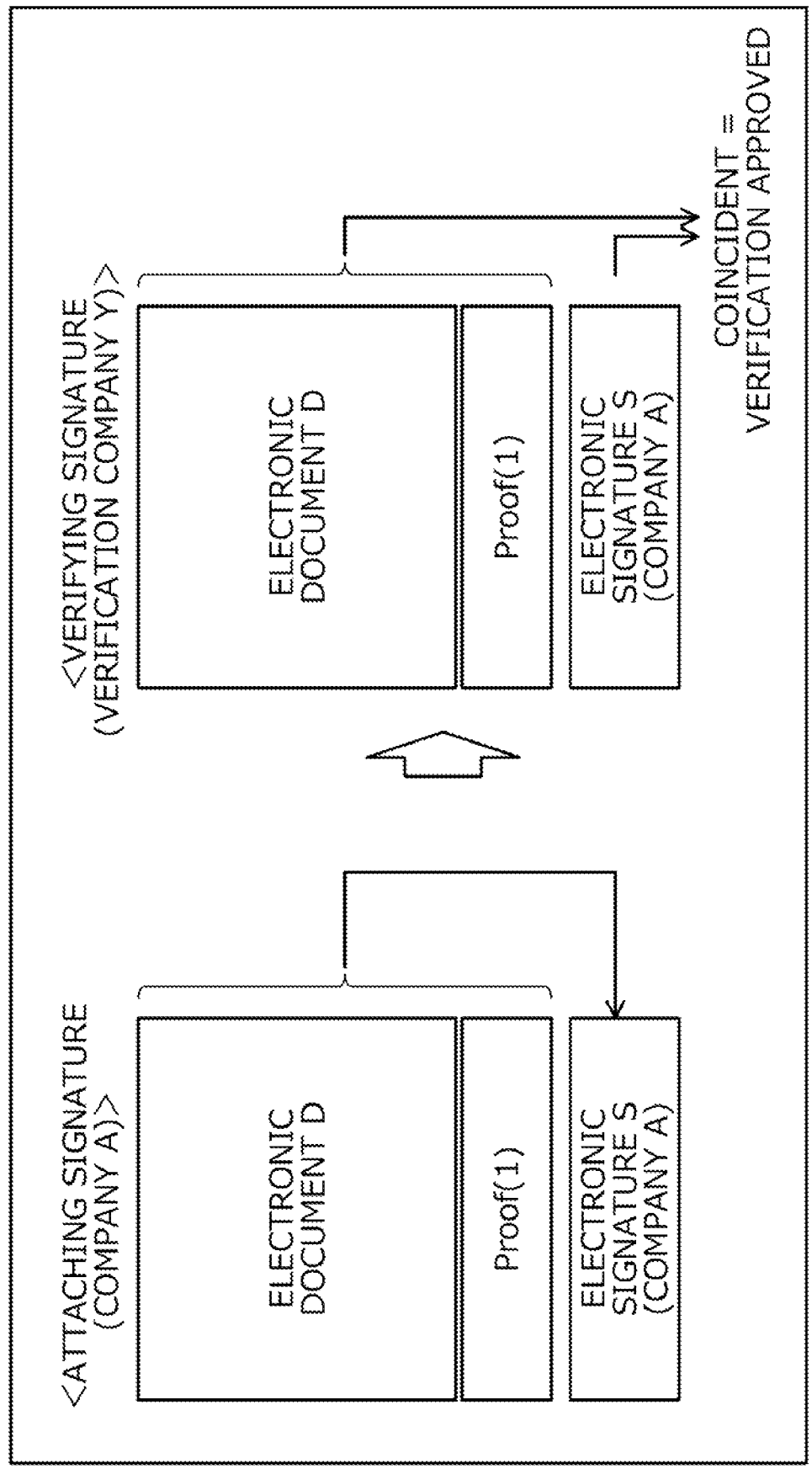
FIG. 13 is an explanatory diagram illustrating an example of attaching and an example of verifying an electronic signature.

FIG. 13 is an explanatory diagram illustrating an example of attaching and an example of verifying an electronic signature. In FIG. 13, when attaching the electronic signature S, the company A (signature device 201) appends the proof (1) to the electronic document D and calculates the hash value of "electronic document D+proof (1)". Next, the company A (signature device 201) generates the electronic signature S by encrypting the calculated hash value using its own private key. Then, the company A (signature device 201) attaches the generated electronic signature S to the electronic document D to which the proof (1) is appended.

In FIG. 13, when verifying the electronic signature S (electronic document D), the verification company Y (verification server 204) calculates the hash value of "electronic document D+proof (1)". However, the same function as the hash function used in the company A (signature device 201) when generating the electronic signature S is used.

Next, the verification company Y (verification server 204) acquires the public key of the company A and decrypts the electronic signature S using the acquired public key. Then, the verification company Y (verification server 204) compares the hash value obtained by the decryption with the calculated hash value.

Here, when the hash values coincide with each other, the verification company Y (verification server 204) regards that the verification has been approved (the electronic document D to which the proof (1) is appended is correct). On the other hand, when the hash values do not coincide with each other, the verification company Y (verification server 204) regards that the verification has been disapproved (the electronic document to which the proof (1) is appended is not correct).

(Example of Reconstructing Proof)

Next, an example of reconstructing the proof will be described with reference to FIGS. 14A to 14C.

Figure 14A:
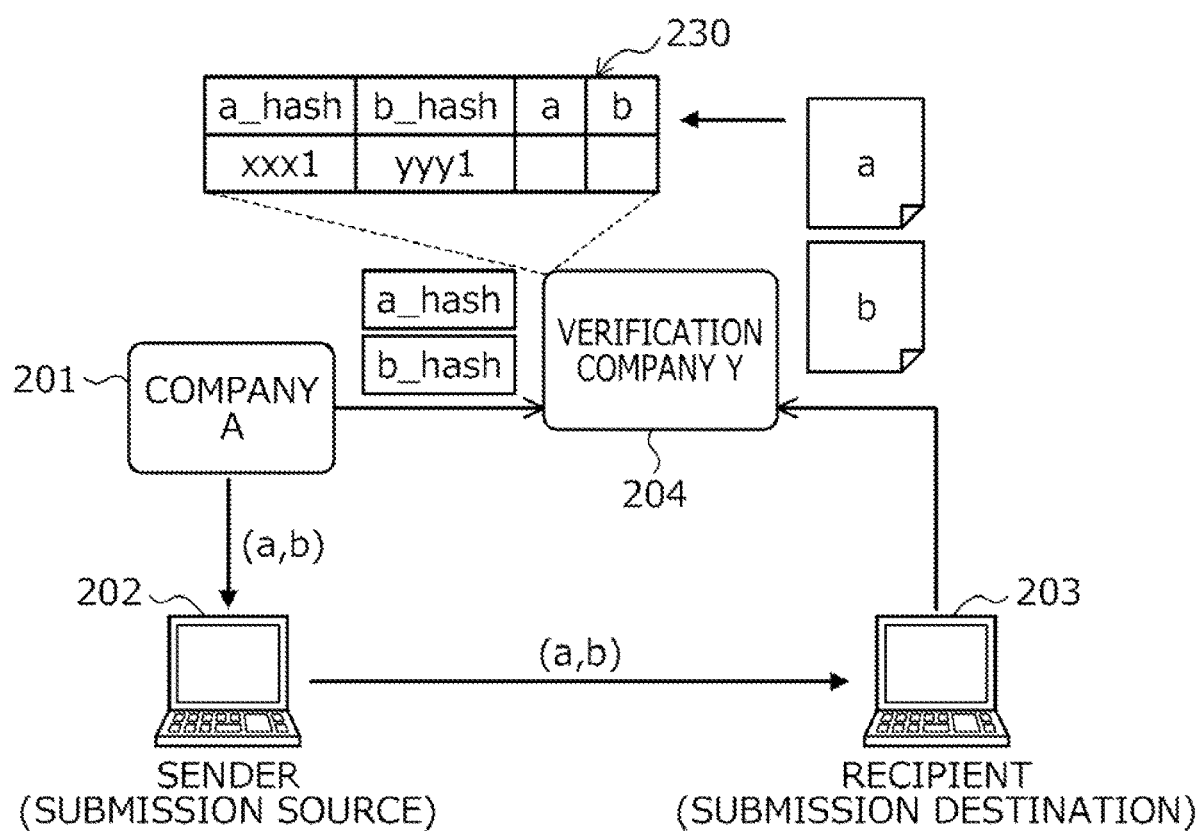
FIG. 14A is an explanatory diagram (part 1) illustrating an example of the reconstruction of the proof.
Figure 14B:
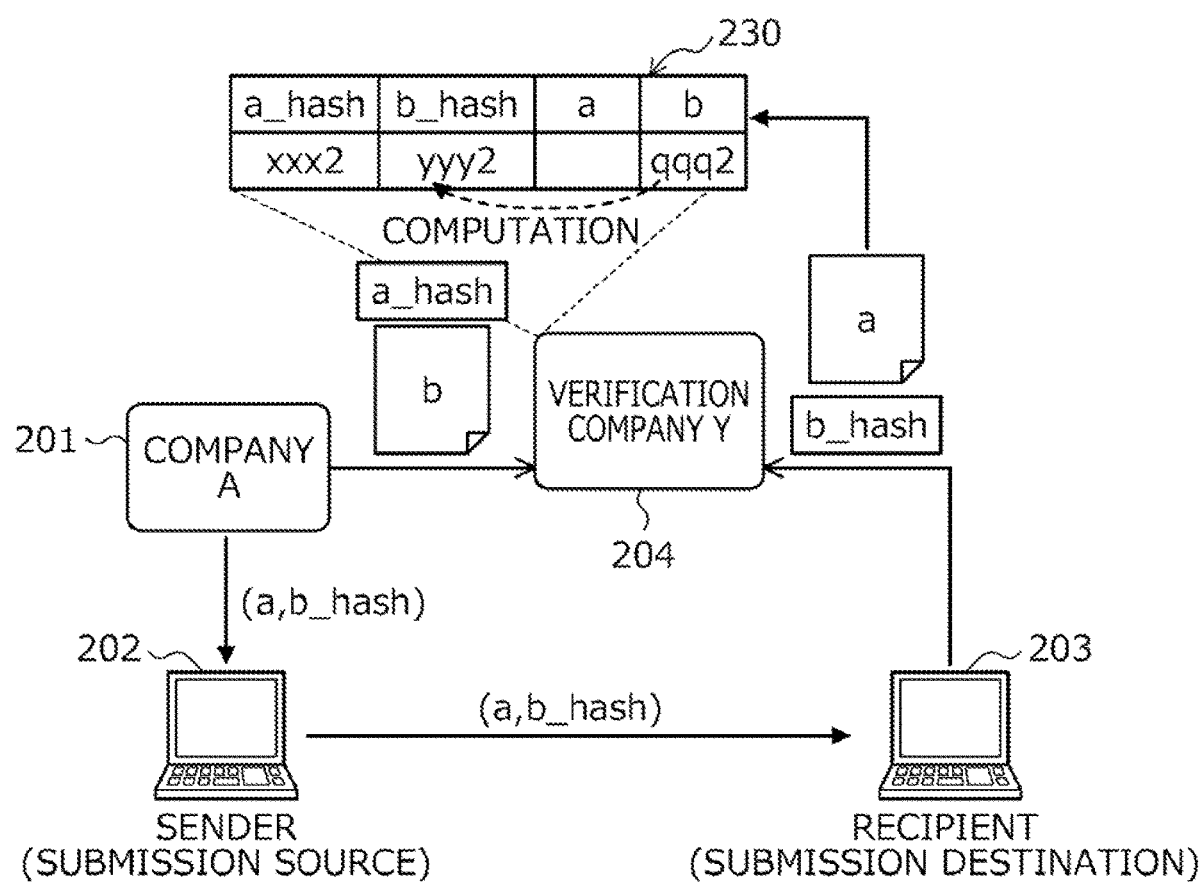
FIG. 14B is an explanatory diagram (part 2) illustrating an example of the reconstruction of the proof.
Figure 14C:
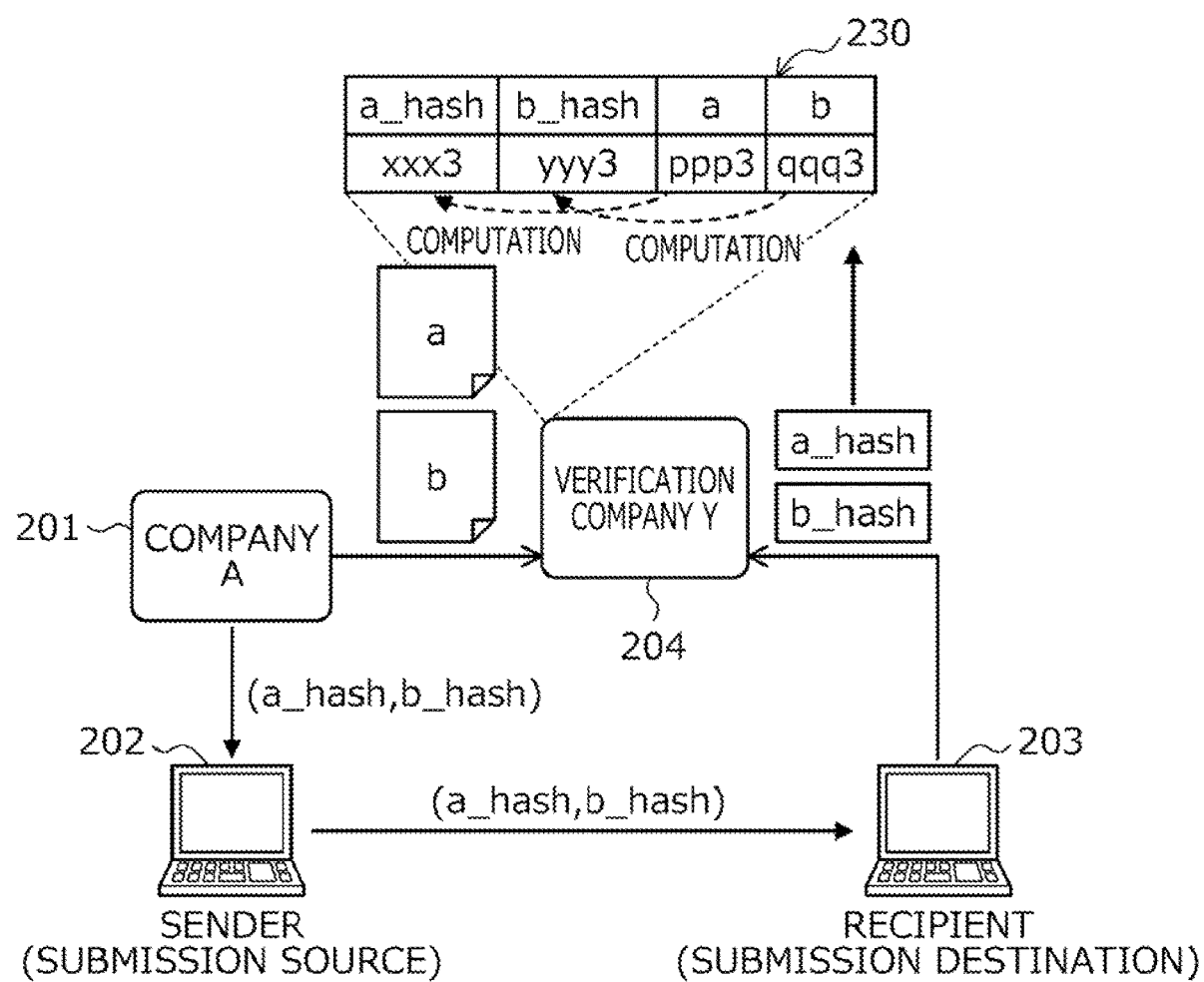
FIG. 14C is an explanatory diagram (part 3) illustrating an example of the reconstruction of the proof.

FIGS. 14A to 14C are explanatory diagrams illustrating an example of the reconstruction of the proof. First, in FIG. 14A, a case where the combination pattern of the proof (1) is (i) will be described. In this case, the proof (1) includes a (attribute information: ppp1) and b (certification information: qqq1). Meanwhile, the proof (2) includes a_hash (the hash value of the attribute information: xxx1) and b_hash (the hash value of the certification information: yyy1).

When receiving the proof (2) from the company A (signature device 201), the verification company Y (verification server 204) registers a_hash (the hash value of the attribute information: xxx1) and b_hash (the hash value of the certification information: yyy1) in the matching table 230 in association with each other. As a result, the matching data 500-1 (refer to FIG. 5) is stored as a record.

When receiving a verification order containing the proof (1) from the recipient (user terminal 203), the verification company Y (verification server 204) calculates the hash value (a_hash) of a (attribute information) included in the proof (1). Furthermore, the verification company Y (verification server 204) calculates the hash value (b_hash) of b (certification information) included in the proof (1).

Next, the verification company Y (verification server 204) refers to the matching table 230 to make a search for matching data relevant to calculated a_hash and b_hash. Here, when the matching data is found by the search, the verification company Y (verification server 204) reconstructs the proof.

For example, when the matching data 500-1 is found by the search, the verification company Y (verification server 204) reconstructs the proof made up of a (attribute information: ppp1) and b (certification information: qqq1) from a and b included in the proof (1). Then, the verification company Y (verification server 204) verifies the proof from the attribute information: ppp1 and the certification information: qqq1 in the reconstructed proof.

Note that, when the matching data relevant to a_hash and b_hash is not found by the search, the verification company Y (verification server 204) regards the verification result for the proof to be verification disapproved. For example, when the proof (1) is tampered with by the sender (submission source) or the like, the relevant matching data is not found by the search in the matching table 230, and the verification results in disapproval.

Next, in FIG. 14B, a case where the combination pattern of the proof (1) is (ii) will be described. In this case, the proof (1) includes a (attribute information: ppp2) and b_hash (the hash value of the certification information: yyy2). Meanwhile, the proof (2) includes a_hash (the hash value of the attribute information: xxx2) and b (certification information: qqq2).

When receiving the proof (2) from the company A (signature device 201), the verification company Y (verification server 204) calculates b_hash (the hash value of the certification information: yyy2) from b (certification information: qqq2). Then, the verification company Y (verification server 204) registers a_hash (the hash value of the attribute information: xxx2), b_hash (the hash value of the certification information: yyy2), and b (certification information: qqq2) in the matching table 230 in association with each other. As a result, the matching data 500-2 (refer to FIG. 5) is stored as a record.

When receiving a verification order containing the proof (1) from the recipient (user terminal 203), the verification company Y (verification server 204) calculates the hash value (a_hash) of a (attribute information) included in the proof (1). Next, the verification company Y (verification server 204) refers to the matching table 230 to make a search for matching data relevant to calculated a_hash, and b_hash (the hash value of the certification information) included in the proof (1). Here, when the matching data is found by the search, the verification company Y (verification server 204) reconstructs the proof.

For example, when the matching data 500-2 is found by the search, the verification company Y (verification server 204) reconstructs the proof made up of a (attribute information: ppp2) and b (certification information: qqq2) from a included in the proof (1) and b included in matching data 500-2. Then, the verification company Y (verification server 204) verifies the proof from the attribute information: ppp2 and the certification information: qqq2 in the reconstructed proof.

Next, in FIG. 14C, a case where the combination pattern of the proof (1) is (iii) will be described. In this case, the proof (1) includes a_hash (the hash value of the attribute information: xxx3) and b_hash (the hash value of the certification information: yyy3). Meanwhile, the proof (2) includes a (attribute information: ppp3) and b (certification information: qqq3).

When receiving the proof (2) from the company A (signature device 201), the verification company Y (verification server 204) calculates a_hash (the hash value of the attribute information: xxx3) from a (attribute information: ppp3). Furthermore, the verification company Y (verification server 204) calculates b_hash (the hash value of the certification information: yyy3) from b (certification information: qqq3).

Then, the verification company Y (verification server 204) registers a_hash (the hash value of the attribute information: xxx3), b_hash (the hash value of the certification information: yyy3), a (attribute information: ppp3), and b (certification information: qqq3) in the matching table 230 in association with each other. As a result, the matching data 500-3 (refer to FIG. 5) is stored as a record.

When receiving the verification or der containing the proof (1) from the recipient (user terminal 203), the verification company Y (verification server 204) refers to the matching table 230 to make a search for matching data relevant to a_hash (the hash value of the attribute information) and b_hash (the hash value of the certification information) included in the proof (1). Here, when the matching data is found by the search, the verification company Y (verification server 204) reconstructs the proof.

For example, when the matching data 500-3 is found by the search, the verification company Y (verification server 204) reconstructs the proof made up of a (attribute information: ppp3) and b (certification information: qqq3) from a and b included in the matching data 500-3. Then, the verification company Y (verification server 204) verifies the proof from the attribute information: ppp3 and the certification information: qqq3 in the reconstructed proof.

(Operation Example when Ordering Verification of Proof)

Next, an operation example when the recipient (user terminal 203) orders the verification company Y (verification server 204) to verify the proof will be described with reference to FIG. 15.

FIG. 15 is an explanatory diagram illustrating an operation example when ordering the verification of the proof. In FIG. 15, an electronic document 1500 received from the sender (user terminal 202) is displayed on the user terminal 203 of the recipient. The electronic document 1500 is an example of the electronic document D. An electronic signature 1510 is attached to the electronic document 1500.

Here, a case where the proof (1) transmitted from the sender (user terminal 202) to the recipient (user terminal 203) includes the whole attribute information is supposed.

When the electronic signature 1510 is selected by an operation input from the recipient on the user terminal 203, the attribute information 1520 is displayed. The attribute information 1520 is information (a part of the proof) indicating the attributes of the signer of the electronic signature 1510 and is included in the proof (1) from the sender (user terminal 202). In the attribute information 1520, an unverified button 1521 indicating that the proof has not been verified is displayed.

According to the attribute information 1520, the recipient can confirm the attributes of the signer of the electronic signature 1510 before verifying the proof. Here, the recipient can confirm that the electronic document 1500 (the invoice from the company A to the company B) is signed by the representative (president) of the company A.

Furthermore, when the unverified button 1521 is selected by an operation input from the recipient on the user terminal 203, the verification order for the proof is transmitted to the verification company Y (verification server 204). This verification order may also order the verification of the electronic document 1500.

In addition, when the user terminal 203 receives the verification result from the verification company Y (verification server 204), the received verification result (not illustrated) is displayed. This allows the recipient to confirm the correctness of the signer's attributes. Here, the recipient can confirm whether the attributes (place of work, job title, name) of the signer for the electronic document 1500 are correct. When the verification result is received from the verification company Y (verification server 204), the unverified button 1521 included in the attribute information 1520 is hidden (or switches to "verified").

Note that, when the proof (1) does not include the attribute information, the recipient is supplied with the attribute information from the verification company Y (verification server 204) along with the verification result for the proof and the like and is allowed to confirm the attributes of the signer and the correctness of the attributes. In this case, the recipient can confirm the attribute of the signer and the correctness of the attributes at a timing when the verification result for the proof and the like is supplied.

(Verification Processing Procedures of Information Processing System 200)

Next, a verification processing procedure of the information processing system 200 will be described with reference to FIGS. 16 to 18.

Figure 18:
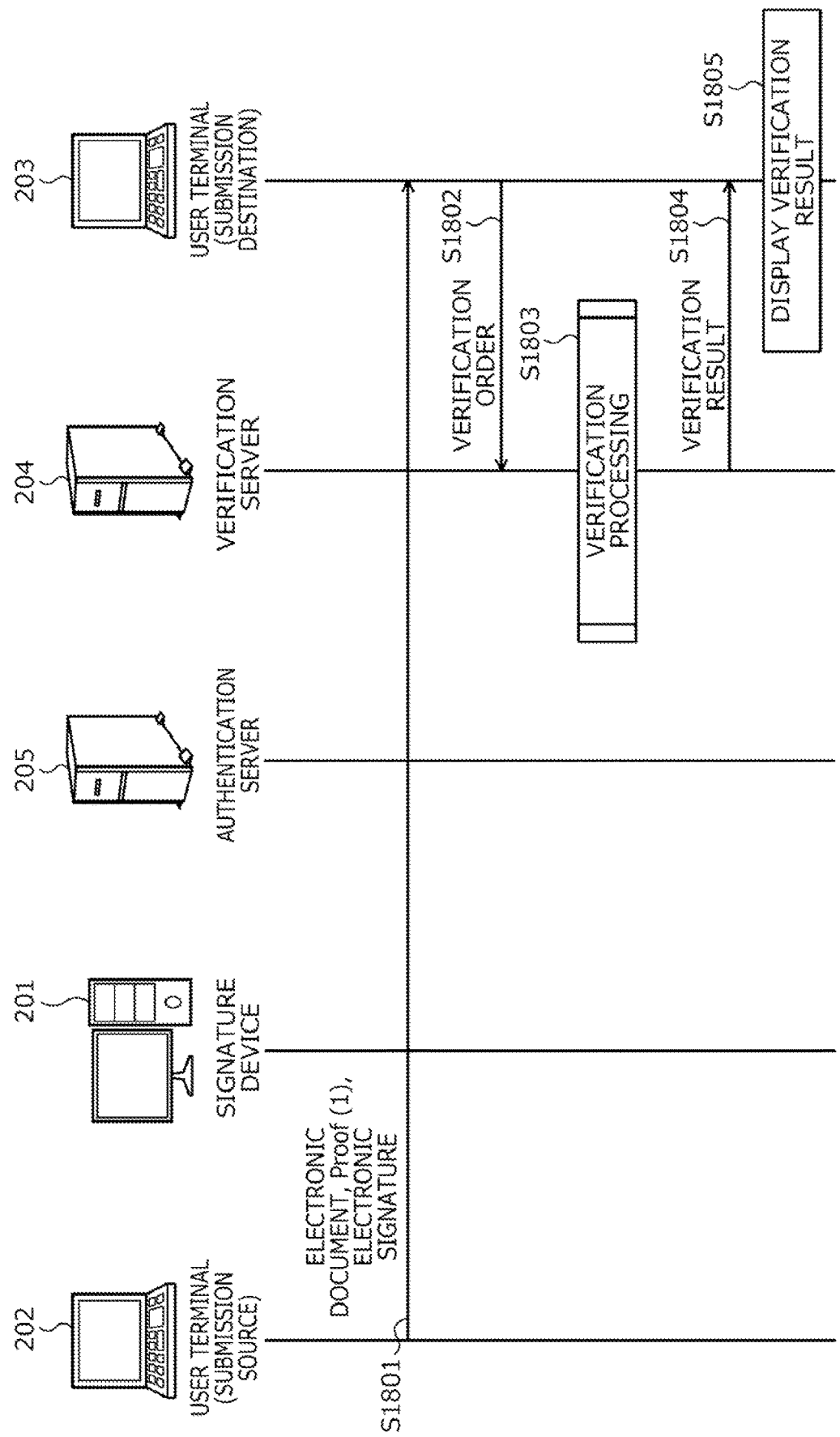
FIG. 18 is a sequence diagram (part 3) illustrating an example of a verification processing procedure of the information processing system 200.

FIGS. 16 to 18 are sequence diagrams illustrating an example of a verification processing procedure of the information processing system 200. In the sequence diagram in FIG. 16, first, the user terminal 202 (submission source) transmits a signing request for the electronic document D to the signature device 201 (step S1601). When receiving the signing request from the user terminal 202 (submission source), the signature device 201 transmits a credential request to the authentication server 205 (step S1602).

The credential request requests the signer's credential (attribute certificate information) issued by the authentication authority. When receiving the credential request from the signature device 201, the authentication server 205 acquires the credential of the signer (step S1603).

Then, the authentication server 205 transmits a credential response including the acquired credential of the signer to the signature device 201 (step S1604). Note that the signer's credential is stored in, for example, an attribute certificate database (DB) (not illustrated) included in the authentication server 205.

Next, the signature device 201 creates a proof (certificate information) of the signer based on the received credential of the signer (step S1605) and proceeds to step S1701 illustrated in FIG. 17.

In the sequence diagram in FIG. 17, first, the signature device 201 executes proof division processing of dividing the created proof into the proof (1) and the proof (2), based on the data amount of the electronic document D (step S1701). The specific processing procedure of the proof division processing of the signature device 201 will be described later with reference to FIG. 19.

Then, the signature device 201 transmits the proof (2) to the verification server 204 via the ID distribution platform 220 (step S1702). Next, the signature device 201 appends the proof (1) to the electronic document D (step S1703). Then, the signature device 201 generates the electronic signature S by encrypting the hash value of the electronic document D to which the proof (1) is appended using the private key of the signer (step S1704).

Next, the signature device 201 transmits the signature response to the user terminal 202 (submission source) (step S1705) and proceeds to step S1801 illustrated in FIG. 18. The signature response contains the electronic document D to which the proof (1) is appended and the electronic signature S attached to the electronic document D (electronic document D+proof (1)+electronic signature 5).

In the sequence diagram in FIG. 18, first, when receiving the signature response from the signature device 201, the user terminal 202 (submission source) transmits the electronic document D to which the proof (1) is appended and the electronic signature S attached to the electronic document D to the user terminal 203 (submission destination) (step S1801).

When receiving the electronic document D to which the proof (1) is appended and the electronic signature S attached to the electronic document D from the user terminal 202 (submission source), the user terminal 203 (submission destination) transmits a verification order to the verification server 204 (step S1802). The verification order orders the verification of the electronic document D and also orders the verification of the proof.

The verification order contains the electronic document D to which the proof (1) is appended and the electronic signature S attached to the electronic document D (electronic document D+proof (1)+electronic signature 5). Note that, when the proof (1) includes the whole attribute information, the user terminal 203 (submission destination) can display the attribute information of the signer at this point in time.

When receiving the verification order from the user terminal 203 (submission destination), the verification server 204 executes the verification processing (step S1803). A specific processing procedure of the verification processing of the verification server 204 will be described later with reference to FIG. 20. Then, the verification server 204 transmits the verification result to the user terminal 203 (submission destination) (step S1804).

When receiving the verification result from the verification server 204, the user terminal 203 (submission destination) displays the received verification result (step S1805). The verification result contains, for example, the verification result for the proof, the verification result for the electronic document D (electronic signature 5), and the attribute information of the signer.

This allows the recipient to confirm the authenticity of the electronic document D and also to confirm the attributes of the signer and the correctness of the attributes on the user terminal 203 (submission destination).

Next, the specific processing procedure of the proof division processing of the signature device 201 in step S1701 illustrated in FIG. 17 will be described with reference to FIG. 19. In the description, the predetermined value α is assumed as "α=02 (20%)".

Figure 19:
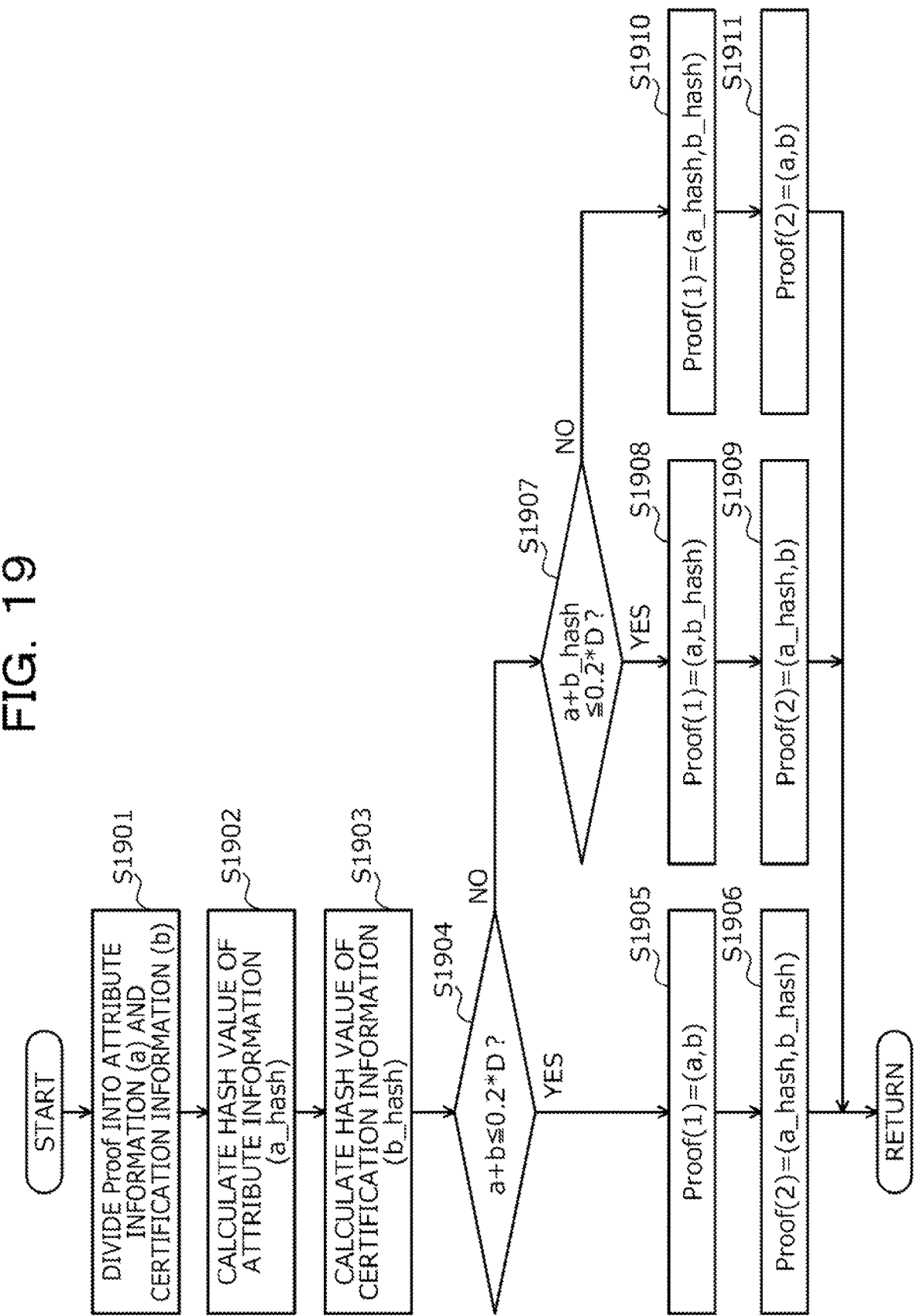
FIG. 19 is a flowchart illustrating an example of a specific processing procedure of proof division processing of the signature device 201.

FIG. 19 is a flowchart illustrating an example of a specific processing procedure of the proof division processing of the signature device 201. In the flowchart in FIG. 19, first, the signature device 201 divides the proof into the attribute information and certification information (step S1901).

Then, the signature device 201 calculates the hash value of the divided attribute information (step S1902).

Next, the signature device 201 calculates the hash value of the divided certification information (step S1903). Then, the signature device 201 determines whether the ratio of the total value of the data amount of the attribute information and the data amount of the certification information to the data amount of the electronic document D is equal to or less than 02 (step S1904).

Note that, in step S1904 in FIG. 19, the reference sign D indicates the data amount of the electronic document D. The reference sign a indicates the data amount of the attribute information. The reference sign b indicates the data amount of the certification information. The reference sign a_hash indicates the data amount of the hash value of the attribute information. The reference sign b_hash indicates the data amount of the hash value of the certification information. The formula "a+b≤0.2*D" indicates that the ratio of the total value of the data amount of the attribute information and the data amount of the certification information to the data amount of the electronic document D is equal to or less than 0.2.

Here, when the ratio is equal to or less than 0.2 (step S1904: Yes), the signature device 201 assigns the proof (1) as the combination (a, b) made up of the attribute information and the certification information (step S1905). Then, the signature device 201 assigns the proof (2) as the combination (a_hash, b_hash) made up of the hash value of the attribute information and the hash value of the certification information (step S1906) and returns to the step from which the proof division processing was called.

Furthermore, in step S1904, when the ratio is not equal to or less than 0.2 (step S1904: No), the signature device 201 determines whether the ratio of the total value of the data amount of the attribute information and the data amount of the hash value of the certification information to the data amount of the electronic document D is equal to or less than 0.2 (step S1907).

Note that, in step S1907 in FIG. 19, the formula "a+b_hash≤0.2*D" indicates that the ratio of the total value of the data amount of the attribute information and the data amount of the hash value of the certification information to the data amount of the electronic document is equal to or less than 0.2.

Here, when the ratio is equal to or less than 0.2 (step S1907: Yes), the signature device 201 assigns the proof (1) as the combination (a, b_hash) made up of the attribute information and the hash value of the certification information (step S1908). Then, the signature device 201 assigns the proof (2) as the combination (a_hash, b) made up of the hash value of the attribute information and the certification information (step S1909) and returns to the step from which the proof division processing was called.

Furthermore, in step S1907, when the ratio is not equal to or less than 0.2 (step S1907: No), the signature device 201 assigns the proof (1) as the combination (a_hash, b_hash) made up of the hash value of the attribute information and the hash value of the certification information (step S1910). Then, the signature device 201 assigns the proof (2) as the combination (a, b) made up of the attribute information and the certification information (step S1911) and returns to the step from which the proof division processing was called.

This makes it possible to partition the proof into the attribute information and the certification information and to specify the range to be included in the proof (1) such that the range is equal to or less than 20% of the data amount of the electronic document D.

Next, the verification processing procedure of the verification server 204 in step S1803 illustrated in FIG. 18 will be described with reference to FIG. 20.

Figure 20:
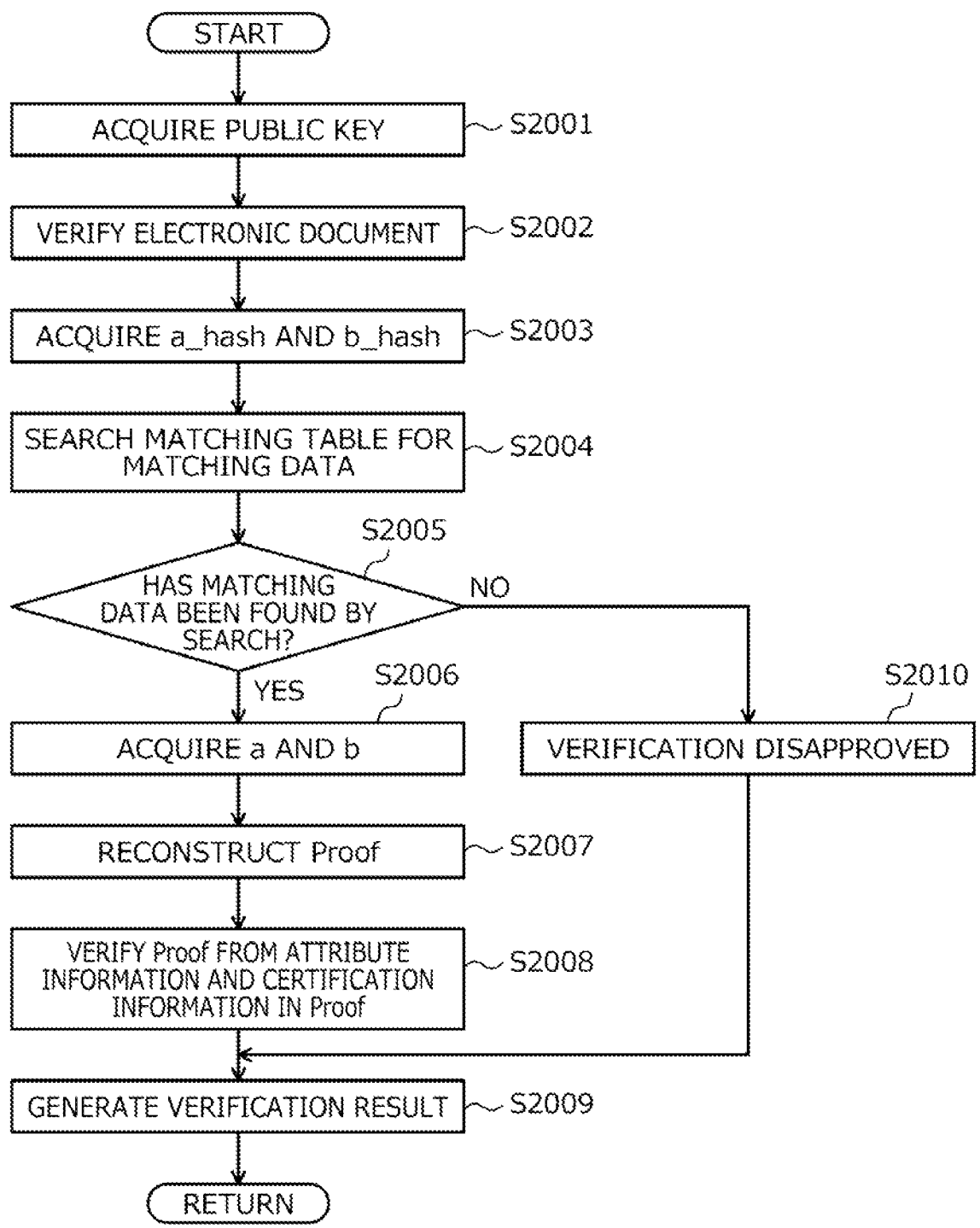
FIG. 20 is a flowchart illustrating an example of a specific processing procedure of verification processing of the verification server 204.

FIG. 20 is a flowchart illustrating an example of a specific processing procedure of the verification processing of the verification server 204. In the flowchart in FIG. 20, first, the verification server 204 acquires the public key of the signer (step S2001). Then, the verification server 204 verifies the authenticity of the electronic document D using the electronic signature S contained in the verification order, based on the acquired public key (step S2002).

Next, the verification server 204 acquires a_hash and b_hash according to the combination pattern of the proof (1) contained in the verification order (step S2003). Then, the verification server 204 searches the matching table 230 for matching data relevant to the combination of acquired a_hash and b_hash (step S2004).

Next, the verification server 204 determines whether the matching data has been found by the search (step S2005). Here, when the matching data is found by the search (step S2005: Yes), the verification server 204 acquires a (attribute information) and b (certification information) (step S2006).

Next, the verification server 204 reconstructs the proof from acquired a (attribute information) and b (certification information) (step S2007), Then, the verification server 204 verifies the authenticity of the proof from the attribute information and the certification information in the reconstructed proof (step S2008).

Next, the verification server 204 generates a verification result based on the result of verifying the authenticity of the electronic document D and the result of verifying the authenticity of the proof (step S2009) and returns to the step from which the verification processing was called.

Furthermore, when the matching data is not found by the search in step S2005 (step S2005: No), the verification server 204 regards the verification result for the proof to be verification disapproved (step S2010) and proceeds to step S2009.

This makes it possible to verify the authenticity of the electronic document D using the electronic signature S and also to verify the authenticity of the proof. For example, by making a search for the matching data relevant to the combination of a_hash and b_hash, it may be verified that the proof has not been tampered with. In addition, by verifying the authenticity of the proof from the attribute information and the certification information in the reconstructed proof, it may be verified whether the whole information that has not been tampered with agrees with the information that has been certified.

As described above, in the signature device 201 according to the embodiment, the proof (1) and the proof (2) may be created from the proof (certificate information) based on the data amount of the electronic document D, in response to the signing request for the electronic document D. Furthermore, according to the signature device 201, the electronic signature S for the electronic document D and the proof (1) may be generated, and the electronic signature S may be attached to the electronic document D such that the electronic document D and the proof (1) with the electronic signature S attached is transmitted to the submission source (user terminal 202) of the electronic document D while the proof (2) is transmitted to the verification server 204 using the ID distribution platform 220. The ID distribution platform 220 is another route different from the route (network 210) connecting the submission source (user terminal 202) and the submission destination (user terminal 203) of the electronic document D.

This may make it possible to confirm the attributes of the signer and also to verify the correctness of the attributes when verifying the authenticity of an electronic document D using the electronic signature S. In addition, by dividing the proof into two, the amount of information of the certificate appended to the electronic document D may be suppressed. Furthermore, since the two are coupled to constitute one proof, by forwarding the proof (1) and the proof (2) separately on distinctive routes, the entire proof that can be certified may not be known even if one is hacked, and the security against the proof may be enhanced.

Additionally, according to the signature device 201, the attribute information, the certification information, the hash value of the attribute information, and the hash value of the certification information may be divided into the proof (1) and the proof (2) such that the ratio of the data amount of the proof (1) to the data amount of the electronic document D is equal to or less than the predetermined value $\alpha$.

This makes it possible to partition the proof into the attribute information and the certification information and to specify the range to be included in the proof (1) such that the range is equal to or less than the predetermined value with respect to the data amount of the electronic document D. Therefore, the data amount of the proof (1) with respect to the electronic document D is restrained from becoming large, which may mitigate an increase in the communication overhead. Note that the ID distribution platform 220 is implemented by a cloud or the like, and an increase in the amount of communication due to the exchange of the proof (2) is less likely to be a disadvantage than with the network 210 such as the Internet.

Furthermore, according to the signature device 201, among the first combination (a, b), the second combination (a, b_hash), and the third combination (a_hash, b_hash), the first combination (a, b) or the second combination (a, b_hash) may be assigned as the proof (1) in preference to the third combination (a_hash, b_hash).

This makes it possible for the submission destination (recipient) of the electronic document D to confirm the attribute information of the signer before verifying the proof. For example, by forwarding the proof (1) including the attribute information from the sender by mail or the like (the combination pattern is (i) or (ii)), the recipient is allowed to confirm the attribute information (attribute names and attribute values) of the signer without accessing the ID distribution platform 220 (with no need to acquire the attribute information from the verification server 204).

In addition, according to the signature device 201, the credential (attribute certificate information) of the signer may be acquired from the authentication server 205 by way of the ID distribution platform 220 in response to the signing request for the electronic document D, and the proof of the signer may be created based on the acquired credential.

This makes it possible to create the proof by unrevealing an attribute that does not need to be revealed or certifying whether a certain condition is satisfied, on the basis of the signer's credential issued by the authentication authority.

Furthermore, in the verification server 204 according to the embodiment, the proof (2) is received from the signature device 201, and the proof (1) is received from the submission destination of the electronic document D, which allows the authenticity of the proof to be verified based on the received proof (1) and the received proof (2).

This makes it possible to reconstruct the proof from the proof (1) and the proof (2) obtained by separate channels and to verify whether the attribute information has the correct information that has been certified.

In addition, in the verification server 204 according to the embodiment, the electronic document D to which the proof (1) is appended and the electronic signature S attached to the electronic document D may be received from the submission destination of the electronic document D, and the authenticity of the electronic document D to which the proof (1) is appended may be verified using the electronic signature S.

This makes it possible to verify that the electronic document has the correct information that has not been tampered with. Besides, it is possible to discourage disconnection of the proof from the electronic document D or tampering because the proof may not be reconstructed unless the electronic document D to which the proof (1) is appended is signed and the proof (2) is acquired in a separate way.

From these facts, in the information processing system 200 according to the embodiment, the confirmation of the attributes of the signer and the verification of the correctness of the attributes may be allowed when the authenticity of the electronic document D is verified using the electronic signature S, while the amount of information of the certificate appended to the electronic document D may be suppressed and the deterioration of the transmission efficiency may be avoided.

Note that the information processing method described in the present embodiment may be implemented by executing a prepared program on a computer such as a personal computer or a workstation. The present information processing program is recorded on a computer-readable recording medium such as a hard disk, flexible disk, CD-ROM, DVD, or USB memory and is read from the recording medium to be executed by a computer. Additionally, the present information processing program may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program that causes a computer to execute processing comprising:
    creating first partial certificate information and second partial certificate information from certificate information that includes attribute information of a signer and certification information configured to certify the attribute information, based on a data amount of an electronic document, in response to a signing request for the electronic document;
    generating an electronic signature for the electronic document and the first partial certificate information;
    attaching the generated electronic signature to the electronic document and the first partial certificate information, and transmitting the electronic document and the first partial certificate information with the electronic signature attached to a submission source of the electronic document; and
    transmitting the second partial certificate information to a verification device that verifies authenticity of the certificate information of the signer, using another route different from a route that connects the submission source and a submission destination of the electronic document.

2. The non-transitory computer-readable recording medium storing the information processing program according to claim 1, wherein the creating includes
    dividing the attribute information, the certification information, a summary value of the attribute information, and the summary value of the certification information into the first partial certificate information and the second partial certificate information such that a ratio of the data amount of the first partial certificate information to the data amount of the electronic document is equal to or less than a predetermined value.

3. The non-transitory computer-readable recording medium storing the information processing program according to claim 2, wherein the creating includes,
    among a first combination of the attribute information and the certification information, a second combination of the attribute information and the summary value of the certification information, and a third combination of the summary value of the attribute information and the summary value of the certification information, assigning the first combination or the second combination as the first partial certificate information in preference to the third combination.

4. The non-transitory computer-readable recording medium storing the information processing program according to claim 1, wherein the certificate information is created based on attribute certificate information of the signer issued by an authentication authority.

5. The non-transitory computer-readable recording medium storing the information processing program according to claim 1, wherein the authenticity of the certificate information of the signer is verified based on the second partial certificate information transmitted to the verification device and the first partial certificate information transmitted from the submission destination of the electronic document to the verification device.

6. The non-transitory computer-readable recording medium storing the information processing program according to claim 1, wherein the authenticity of the electronic document is verified based on the electronic signature.

7. A computer-implemented method comprising:
    creating first partial certificate information and second partial certificate information from certificate information that includes attribute information of a signer and certification information configured to certify the attribute information, based on a data amount of an electronic document, in response to a signing request for the electronic document;
    generating an electronic signature for the electronic document and the first partial certificate information;
    attaching the generated electronic signature to the electronic document and the first partial certificate information, and transmitting the electronic document and the first partial certificate information with the electronic signature attached to a submission source of the electronic document; and
    transmitting the second partial certificate information to a verification device that verifies authenticity of the certificate information of the signer, using another route different from a route that connects the submission source and a submission destination of the electronic document.

8. An information processing device comprising:
    a memory storing instructions; and a processor, coupled to the memory, that executes the instructions to perform a process that:
  creates first partial certificate information and second partial certificate information from certificate information that includes attribute information of a signer and certification information configured to certify the attribute information, based on a data amount of an electronic document, in response to a signing request for the electronic document;
  generates an electronic signature for the electronic document and the first partial certificate information;
  attaches the generated electronic signature to the electronic document and the first partial certificate information, and transmits the electronic document and the first partial certificate information with the electronic signature attached to a submission source of the electronic document; and
  transmits the second partial certificate information to a verification device that verifies authenticity of the certificate information of the signer, using another route different from a route that connects the submission source and a submission destination of the electronic document.

9. An information processing system comprising:
a memory storing instructions; and
an information processing device, coupled to the memory, that executes the instructions to perform a process that:
  creates first partial certificate information and second partial certificate information from certificate information that includes attribute information of a signer and certification information configured to certify the attribute information, based on a data amount of an electronic document, in response to a signing request for the electronic document; generates an electronic signature for the electronic document and the first partial certificate information; attaches the generated electronic signature to the electronic document and the first partial certificate information, and transmits the electronic document and the first partial certificate information with the electronic signature attached to a submission source of the electronic document; and transmits the second partial certificate information to a verification device, using another route different from a route that connects the submission source and a submission destination of the electronic document; and
  the verification device that: receives the second partial certificate information from the information processing device; receives the first partial certificate information from the submission destination of the electronic document; and verifies authenticity of the certificate information of the signer based on the received second partial certificate information and the received first partial certificate information.

* * * * *